(12) United States Patent
Chang et al.

(10) Patent No.: US 7,636,365 B2
(45) Date of Patent: Dec. 22, 2009

(54) SMART DIGITAL MODULES AND SMART DIGITAL WALL SURFACES COMBINING THE SAME, AND CONTEXT AWARE INTERACTIVE MULTIMEDIA SYSTEM USING THE SAME AND OPERATION METHOD THEREOF

(75) Inventors: Seongju Chang, Kyeonggi-do (KR); V. Michael Bove, Wrentham, MA (US); Jaqueline Mallett, Cambridge, MA (US); Brian J. Mullins, Boston, MA (US)

(73) Assignee: Korea Advanced Institute of Science and Technology (KAIST), Daejeon (KR)

( * ) Notice: Subject to any disclaimer, the term of this patent is extended or adjusted under 35 U.S.C. 154(b) by 880 days.

(21) Appl. No.: 11/054,109

(22) Filed: Feb. 9, 2005

(65) Prior Publication Data

US 2005/0254505 A1    Nov. 17, 2005

Related U.S. Application Data

(60) Provisional application No. 60/570,685, filed on May 13, 2004.

(30) Foreign Application Priority Data

Aug. 9, 2004 (KR) ............ 10-2004-0062497
Aug. 9, 2004 (KR) ............ 10-2004-0062498

(51) Int. Cl.
*H04L 12/28* (2006.01)
(52) U.S. Cl. .................. 370/401; 709/224

(58) Field of Classification Search .......... None
See application file for complete search history.

(56) References Cited

U.S. PATENT DOCUMENTS

| 6,553,336 | B1* | 4/2003 | Johnson et al. ........... 702/188 |
| 6,834,195 | B2* | 12/2004 | Brandenberg et al. .... 455/456.3 |
| 7,339,957 | B2* | 3/2008 | Hitt ........................... 370/509 |
| 7,373,144 | B1* | 5/2008 | Kirkpatrick et al. ........ 455/421 |
| 2004/0030778 | A1* | 2/2004 | Kronenberg et al. ....... 709/224 |
| 2005/0195775 | A1* | 9/2005 | Petite et al. ................ 370/338 |

FOREIGN PATENT DOCUMENTS

KP    1020010103481    11/2001

(Continued)

OTHER PUBLICATIONS

Agamanolis, S., Isis, Cabbage and Viper: New Tools and Strategies for Designing Responsive Media, Jun. 2001.

(Continued)

*Primary Examiner*—Phirin Sam
(74) *Attorney, Agent, or Firm*—Gifford, Krass, Sprinkle, Anderson & Citkowski, P.C.

(57) ABSTRACT

Disclosed are smart digital modules, a smart digital wall combining the smart digital modules, a context-aware interactive multimedia system, and an operating method thereof. The smart digital wall includes local coordinators for controlling the smart digital modules, and a coordination process for controlling the smart digital modules. The smart digital modules sense ambient states and changes of states and independently display corresponding actuations. The coordination process is connected to the smart digital modules via radio communication, and combines smart digital modules to control collective operations of the smart digital modules.

61 Claims, 22 Drawing Sheets

FOREIGN PATENT DOCUMENTS

| | | |
|---|---|---|
| KP | KR1020030095798 | 12/2003 |
| KP | KR1020040064587 | 7/2004 |
| KR | 10-2001-0032883 | 4/2001 |
| KR | 2003-0045238 | 2/2005 |

OTHER PUBLICATIONS

Maes, P et al. The Alive System: Wireless, Full-body Interaction with Autonomous Agents, Nov. 1995.

Pape, D. et al. CAVE User's Guide, May 11, 1997.

Davenport, G. et al. Synergistic storyscapes and constructionist cinematic sharing, IBM Systems Journal, vol. 39, Nos. 3&4, 2000.

Pinhanez, C. Creating Ubiquitous Interactive Games Using Everywhere Displays Projectors, May 14-17, 2002.

Prante, T. et al. Hello.Wall—Beyond Ambient Displays. Oct. 2003.

Ahmad, I. Cluster Computing: A glance at Recent Events, Jan.-Mar. 2000.

Agamanolis, S. Portrait of Cati—a portrait with a sense of its personal space.

"Context Aware Video Phone Interface Constructed for SAS System", HCI 2004 Proceedings I-1, Feb. 9-12, 2004, Convention Center, Phoenix park, Kangwon-do, Republic of Korea, Hyoungjun Kim et al.

"Smart Architectural Surfaces for Operational Polymorphism", Proceedings of Korean Ubiguitous Computing Workshop 2004, Feb. 2004, Phoenix park, Kangwon-do, Republic of Korea, Seongju Chang.

* cited by examiner

FIG.7
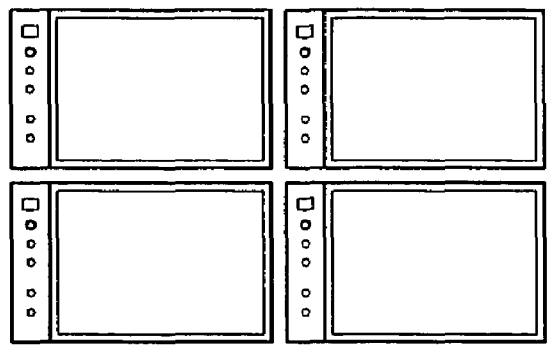
(a)
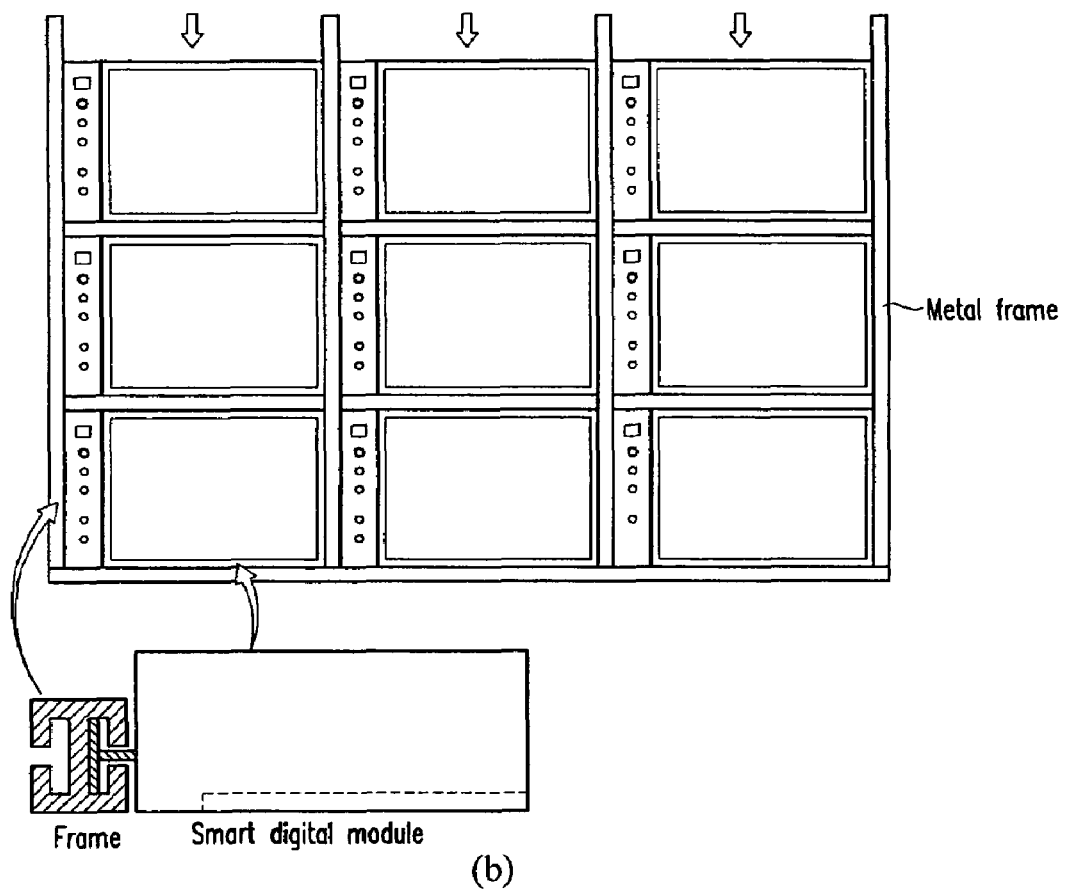
(b)

FIG.8

| Applications | Electronic wall | Video phone | Digital mirror | Info bulletin | VOD | Multimedia |
|---|---|---|---|---|---|---|
| Software components | Local coordinator | Speech synthesizer | Speech recognizer | Media player | State recognizer | |
| API | I/O API | DirectX | TTS API | Speech recognition API | SQL interface | |
| O/S | OS kernel | File I/O | Socket | Video I/O | Audio I/O | |
| Hardware | Temperature and humidity sensor | Photometer | Ultrasonic sensor | IR sensor | LCD display | Speaker | LED |
| | Camera | Microphone | | | | | |

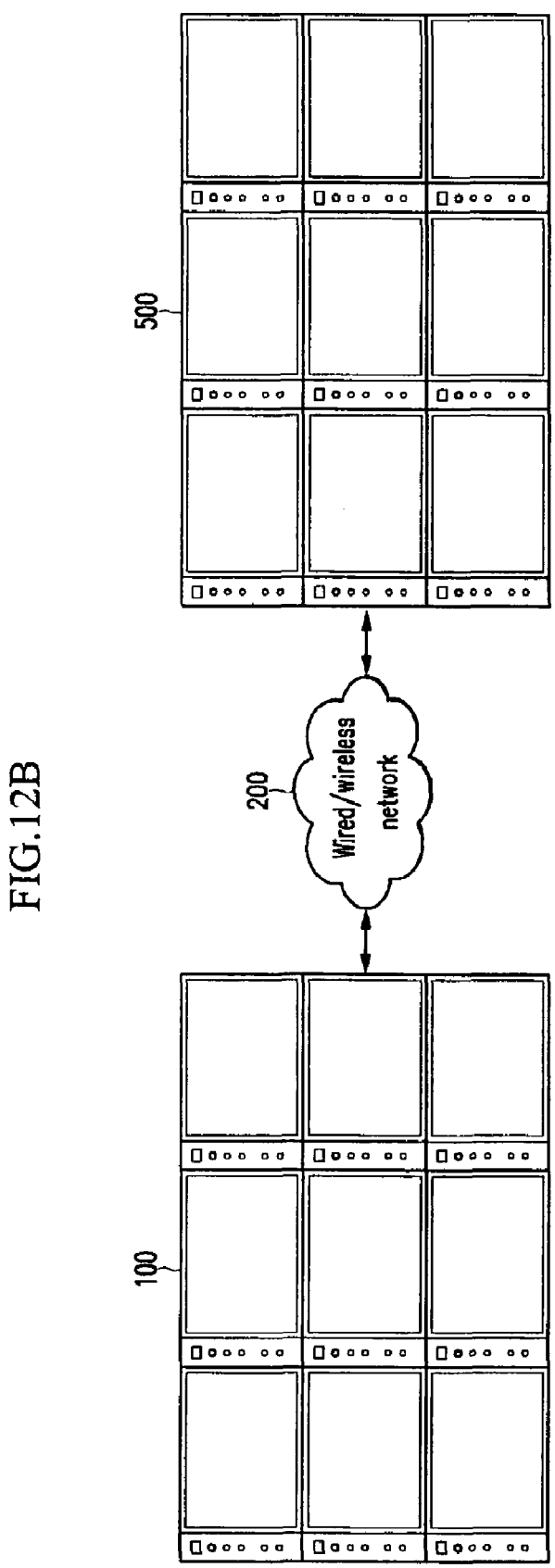

FIG.15B
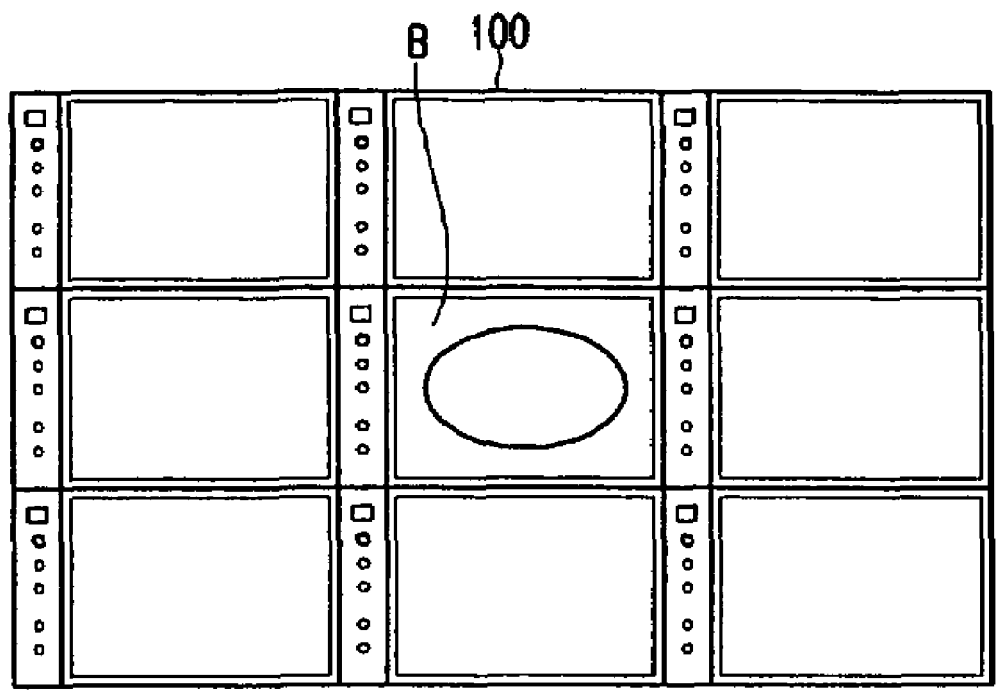
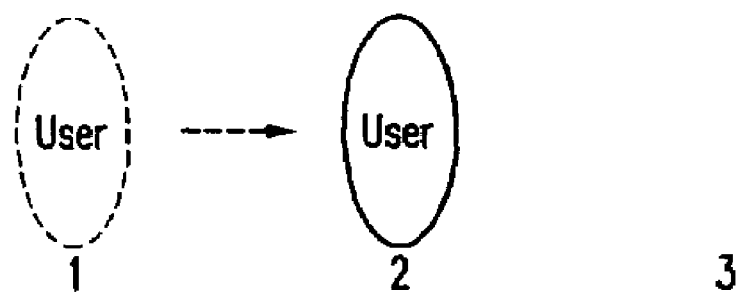

FIG.15C
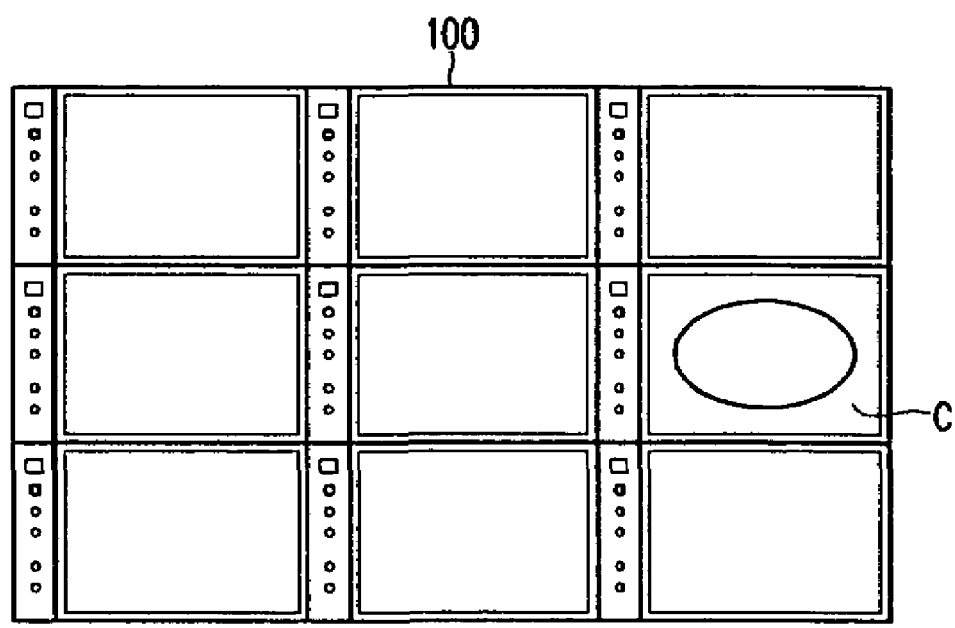
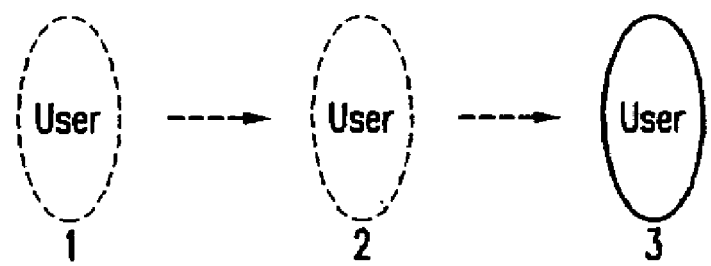

SMART DIGITAL MODULES AND SMART DIGITAL WALL SURFACES COMBINING THE SAME, AND CONTEXT AWARE INTERACTIVE MULTIMEDIA SYSTEM USING THE SAME AND OPERATION METHOD THEREOF

CROSS REFERENCE TO RELATED APPLICATION

This application claims priority to and the benefit of U.S. Provisional Patent Application No. 60/570,685 filed on May 13, 2004 in the USPTO and Korea Patent Applications No. 10-2004-62497 filed on Aug. 9, 2004 and No. 10-2004-62498 filed on Aug. 9, 2004 in the Korean Intellectual Property Office, the entire content of which is incorporated herein by reference.

BACKGROUND OF THE INVENTION (a) Field of the Invention

The present invention relates to a smart architectural surface (SAS). More specifically, the present invention relates to smart digital modules combined by sensing, cognition, and actuation capabilities; every digital module is a complete, independent computer with inputs, outputs, and communications; the digital modules are globally coordinated or self-organized to solve problems cooperatively; and the digital modules stack up or snap into a framework to form a smart digital wall which is a planar construct for interfacing various interactions with a user by using the smart digital modules, and a context-aware interactive multimedia system and an operation method thereof.

(b) Description of the Related Art

Walls in buildings or houses have various functions as well as physical components for partitioning the space into smaller ones in the home environment. Attempts to apply screens to the walls for projecting images or video thereon have been suggested as information techniques and display technologies have developed. This trend demonstrates that smart homes or ubiquitous homes as interactive environments with inhabitants have appeared in our time.

As to prior art, Pinhanez of Watson Laboratory in IBM proposed "The Everywhere Displays Projector: A Device To Create Ubiquitous Graphical Interfaces" in the Proc. Of Ubiquitous Computing 2001 (Ubicomp'01), 2001, Atlanta, Ga. In this transaction, the device includes an LCD projector and a rotary mirror, and the LCD projector receives information on a location of an inhabitant and displays information desired by a user on a desired location of a screen. However, the above-noted projector has no device for sensing the location of the user in real-time, and has a limit specific to beam projectors in that part of the screen is hidden when a subject is provided between the projector and a plane of incidence.

As to another prior art, Prante of Germany disclosed "Hello. Wall Beyond Ambient Displays" in the Video Track and Adjunct Proceedings of the $5^{th}$ Intern. Conference on Ubiquitous Computing (Ubicomp'03), Seattle, Wash., USA, Oct. 12-15, 20 which proposes a GossipWall which is an interactive surface for generating different actuated patterns depending on distances from the user and which includes a plurality of cells based on sensors, and each cell uses an LED unit and an RFID transmitter to sense passersby and display various beam patterns. Further, when the user carries the ViewPort, a mobile display with him to approach the GossipWall, the ViewPort reads an ID of each cell and allows the user to read display unique information specific to a predetermined cell. However, this system fails to provide specialized information to the user and requires an additional mobile device for an interactive interface since it only allows the LED to display very limited categories and amount of information.

The ALIVE system built at the MIT Media Lab by Pattie Maes, Bruce Blumberg, Sandy Pentland, and others was a smart room that tracked a person.

Another piece of prior art applicable to reactive display is Stefan Agamanolis' MIT PhD thesis (2001), in which he describes a system called Cabbage which automatically would reconfigure a visual information screen—including changing scale—as a function of distance and activity measured by a distance sensor attached to the video display. Another project of Agamanolis' was for the ID/Entity gallery show where portraits in an art gallery reacted as a viewer moved around in front of them.

Glorianna Davenport at the MIT Media Lab produced a video installation of a flock of pigeons that react to what sensors detect about the presence and activity of viewers.

The previous MIT systems discussed above involve single integrated systems rather than scalable sets of smart modular elements that perform the sensing and output functions. In addition, conventional skills for utilizing the walls of a building as a screen for projected images, and the conventional multimedia reproduction system, video conference system, and video phone system generally output audio and video data, and hence, they provide no various interactive operations with the user.

SUMMARY OF THE INVENTION

It is an advantage of the present invention to provide a smart digital module which combines sensors, information processors, and displays with sensing, recognition, and actuating capabilities, and provide a dynamic input/output/computation ecosystem, which is incrementally scalable from a few units to a very large number of units, has a minimally fixed or centralized infrastructure, and performs globally controlled or self-organized collaborative processing to form a smart digital wall which provides interface with users by combining the smart digital modules.

It is another advantage of the present invention to provide a context-aware interactive multimedia system and an operation method thereof for sensing a user's state through the smart digital modules and allowing interaction with the user by designing multi-sensor processing algorithms to run in a dynamically-changing distributed environment.

In one aspect of the present invention, a smart digital module for reacting to contextual changes comprises: a sensor unit for sensing ambient states and changes of states; an actuator unit for displaying various categories of information in correspondence to the ambient states and changes of states; a display for displaying visual information; and a computer for processing signals output by the sensor and displaying corresponding actuation information to the actuator and the display. The computer changes states of information displayed by the actuator and the display according to the user's location and state sensed by the sensor.

The sensor unit includes sensors for sensing ambient states and changes of states, and the sensors include an environment sensor for detecting the ambient states and a behavior sensor for detecting the user's changes of activities.

In another aspect of the present invention, a smart digital wall for reacting to contextual changes comprises: at least two smart digital modules for sensing ambient states and changes of states and respectively displaying corresponding actuations; and a global coordination process or a decentralized peer-to-peer solution for performing such functions by decision-making and coordination among distributed sensing and display devices built in the smart digital modules and controlling a collective operation of the combined smart digital modules, the coordination process being connected to the smart digital modules through radio communication. The present invention permits building up a smart space out of individual modules in a way that is incrementally scalable, easier to reconfigure and maintain than the traditional model, and has no single point of failure.

The coordination process realizes adaptive actuations corresponding to sensed events through the smart digital modules based on the user's request sensed by at least one smart digital module and recognition of contextual information.

In still another aspect of the present invention, a context-aware video chat system based on a user's location comprises: at least two smart digital modules for respectively measuring a distance to the user, receiving the user's video and audio, and outputting the other party's video and audio; and a coordination process for connecting one or more smart digital modules to the other party's video chat system through a wired/wireless telephone or Internet network, the coordination process being connected to the smart digital modules through radio communication. The coordination process controls a number of the smart digital modules for forming a screen on which the other party's images are reproduced according to the user's location measured by the smart digital modules.

The coordination process controls the volume of the other party's reproduced speech according to the user's location measured by the smart digital modules.

The number of smart digital modules is greater in the case in which the distance to the user from the context-aware video chat system is longer than a predetermined distance than the case in which the distance to the user from the context-aware video chat system is shorter than the predetermined distance.

The speech volume is greater in the case in which the distance to the user from the context-aware video chat system is longer than a predetermined distance than the case in which the distance to the user from the context-aware video chat system is shorter than the predetermined distance.

In still yet another aspect of the present invention, a context-aware video chat system based on a user's location comprises: at least two smart digital modules for respectively measuring a distance to the user, receiving the user's video and audio, and outputting the other party's video and audio; and a coordination process for connecting one or more smart digital modules to the other party's video chat system through a wired/wireless telephone or Internet network, the coordination process being connected to the smart digital modules through radio communication. The coordination process changes the smart digital module to which the other party's images are reproduced according to the user's movement measured by the smart digital modules.

The coordination process changes the smart digital module to which the other party's speech is reproduced according to the user's movement measured by the smart digital modules.

The coordination process uses distance sensors for measuring the distance to the user to perform periodical scanning and sense the user's movement and make the smart digital modules reproduce the other party's images.

In still further another aspect of the present invention, a context-aware video chat method based on a user's location in a context-aware video chat system including at least two smart digital modules for measuring the distance to the user, respectively receiving the user's video and audio, and respectively outputting the other party's video and audio, and a coordination process being connected to smart digital module via radio communication and connecting one or more smart digital modules to the other party's video chat system via a wired/wireless telephone or Internet network, comprises: (a) controlling the smart digital module reproducing the other party's video to measure the distance to the user; (b) controlling the coordination process to compare the distance measured in (a) with a predetermined distance; and (c) controlling the coordination process to control the volume of the other party's reproduced speech and the screen size occupied by the other party displayed through the smart digital modules according to the comparison result.

In still further another aspect of the present invention, a context-aware video chat method based on a user's location in a context-aware video chat system including at least two smart digital modules for measuring the distance to the user, respectively receiving the user's video and audio, and respectively outputting the other party's video and audio, and a coordination process being connected to smart digital module via radio communication and connecting one or more smart digital modules to the other party's video chat system via a wired/wireless network, comprises: (a) controlling the smart digital module reproducing the other party's video to periodically measure the distance to the user in a specific order; (b) controlling the coordination process to determine the video-chatting user's movement based on the distance measured in (a); and (c) controlling the coordination process to determine a smart digital module to which the other party's video are reproduced according to the determination result.

In an alternative aspect of this invention, the above functions are performed without a global coordination process. In this case, modules detecting the presence of the user form a group that collaborates in a peer-to-peer fashion to determine the location and movement of the user and to determine an appropriate module or set of modules which will reproduce the audio and video of the remote party as well as capture video and audio of the user.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIGS. 7(a) and 7(b) show configuration diagrams of the smart digital wall shown in FIG. 6, FIG. 7(a) illustrating a smart digital wall built by a plurality of collective smart digital modules, and FIG. 7(b) illustrating a smart digital wall constructed in a frame inserting manner;

FIG. 8 shows a software architecture for controlling the smart digital wall shown in FIG. 6;

DETAILED DESCRIPTION OF THE PREFERRED EMBODIMENTS

Figure 1:
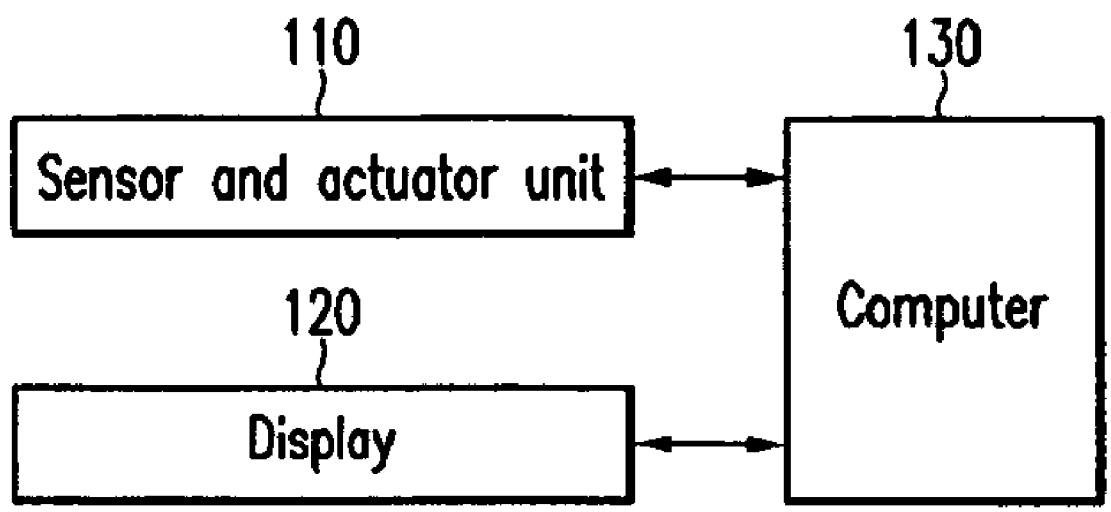
FIG. 1 shows a functional block diagram of a smart digital module according to an exemplary embodiment of the present invention.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which same descriptions are provided have the same reference numerals.

A smart digital module according to an exemplary embodiment of the present invention will now be described.

Figure 4:
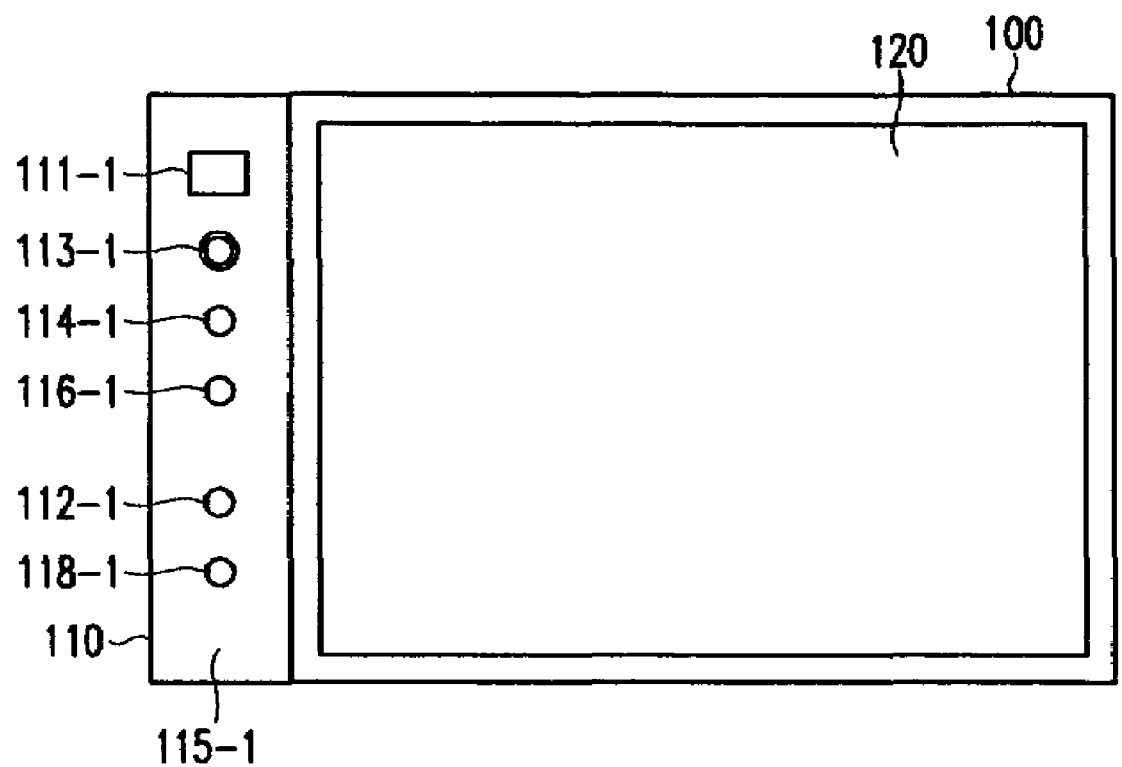
FIG. 4 shows a front view of the smart digital module.
Figure 5:
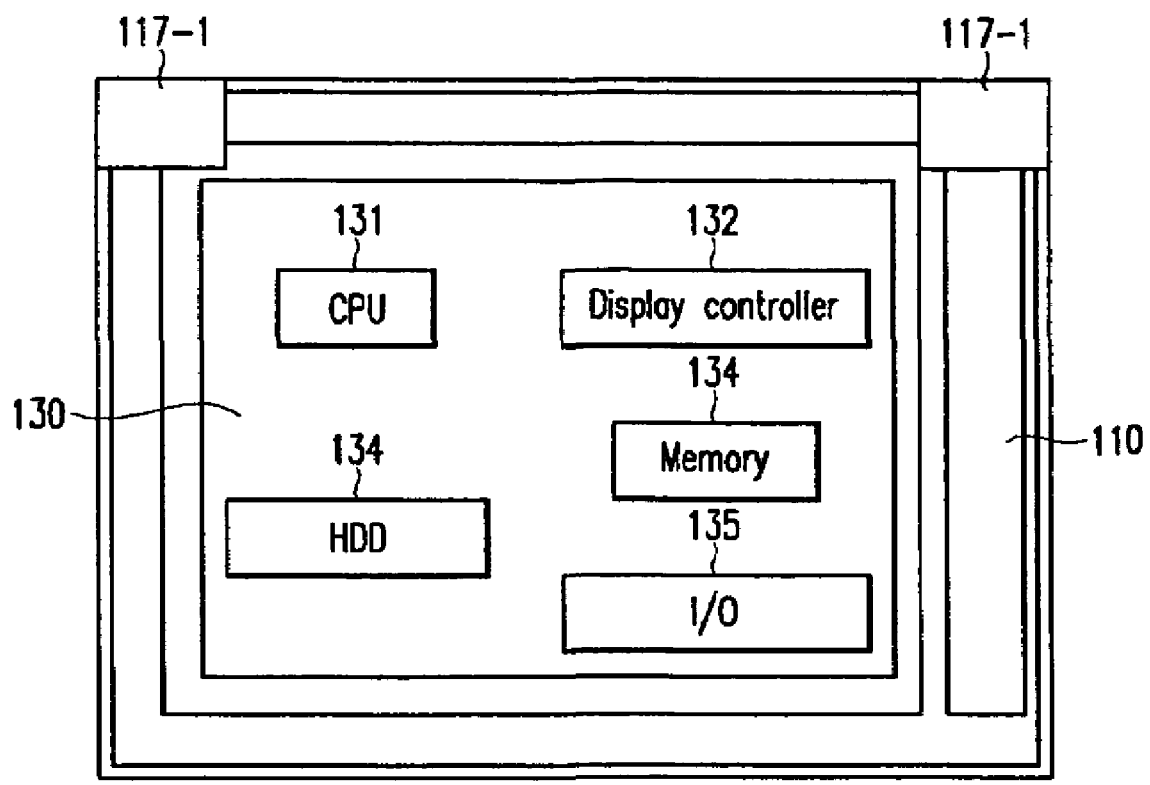
FIG. 5 shows a rear view of the smart digital module.

FIG. 1 shows a functional block diagram of a smart digital module 100 according to an exemplary embodiment of the present invention, FIG. 4 shows a front view of the smart digital module 100, and FIG. 5 shows a rear view of the smart digital module 100.

As shown in FIG. 1, the smart digital module 100 includes a sensor and actuator unit 110, a display 120, and a computer 130.

Figure 2:
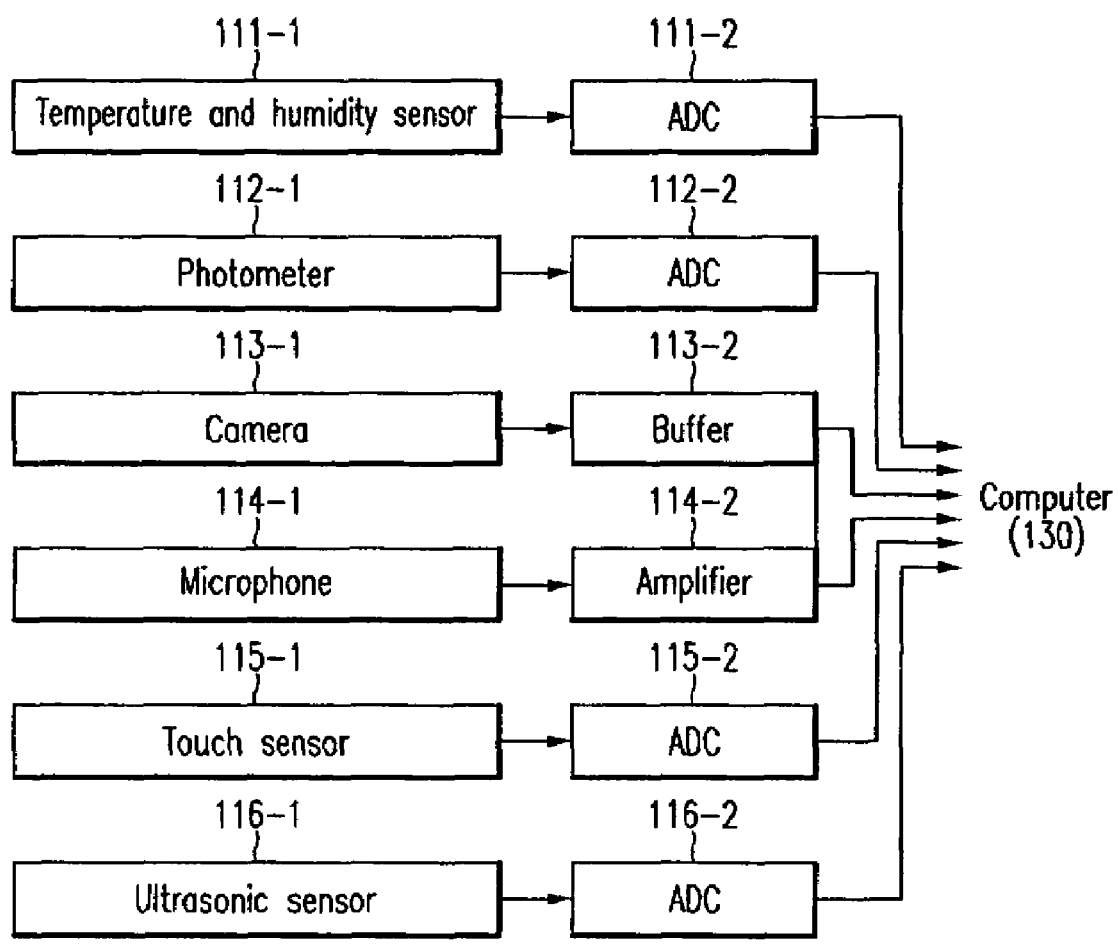
FIG. 2 shows a sensor of a sensing and actuating unit of the smart digital module shown in FIG. 1.

The sensor and actuator unit 110 senses external states or changes of states through various sensors, and outputs actuations of the smart digital module 100. As shown in FIG. 2, the sensors of the sensor and actuator unit 110 include: environment sensors which detect external environments and include a temperature and humidity sensor 111-1 for sensing the temperature and humidity and a photometer 112-1 for sensing luminance; and behavior sensors which detect changes of external environments and include a camera 113-1 for capturing images, a microphone 114-1 for receiving speech, a touch sensor 115-1 for sensing touch inputs, and an ultrasonic sensor 116-1 for sensing the user's location through ultrasonic. Outputs of the respective sensors 111-1, 112-1, 113-1, 114-1, 115-1, and 116-1 are transmitted to the computer 130 through analog/digital converters (ADC) 111-2, 112-2, 115-2, and 116-2, a buffer 113-2, and an amplifier 114-2.

Figure 3:
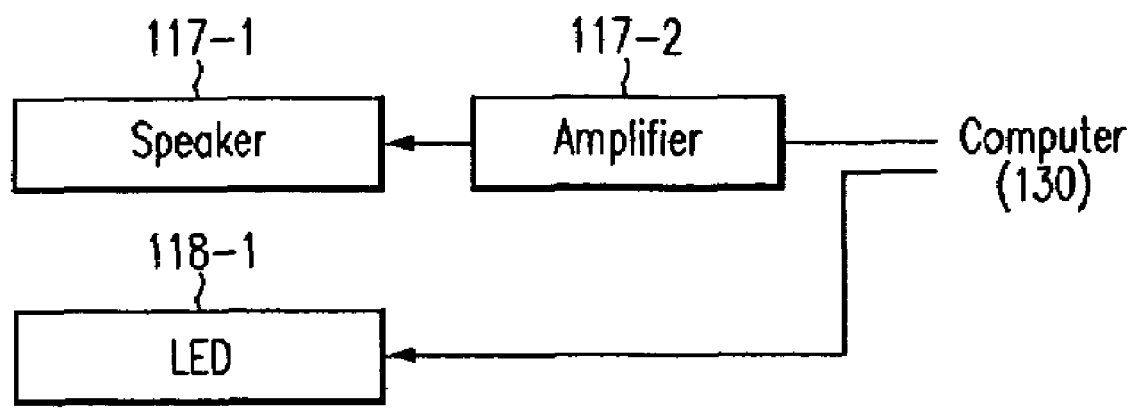
FIG. 3 shows an actuator of a sensing and actuating unit of the smart digital module shown in FIG. 1.

Referring to FIG. 3, the sensor and actuator unit 110 includes a speaker 117-1 and a light emitting diode (LED) 118-1 operable by receiving actuation signals from the computer 130 (through an amplifier 117-2 in the case of the speaker 117-1.)

The sensor and actuator unit 110 may further include various sensors for capturing events required by the smart digital modules 100 and various actuators for outputting actuations of events captured by the sensors.

The display 120 receives signals for displaying visual information from the computer 130 and displays a corresponding image, and it is assumed in the exemplary embodiment that a liquid crystal display (LCD) which is more advantageous than a plasma display panel (PDP) is used in consideration of costs and power consumption. It will be preferable for the LCD to be greater than 15 inches in its size and have a touch screen function.

Referring to FIG. 4, the display 120 is provided on the front of the smart digital modules 100 so that the users may easily view visual information thereon.

The sensor and actuator unit 110 is provided on a long stripe type printed circuit board (PCB) which is located adjacent to the display 120. Referring to FIG. 5, the speaker 117-1 is provided on the top rear side of the display 120, and two speakers 117-1 are provided on two top corners respectively when they are stereo speakers.

The computer 130 receives signals from the sensor and actuator unit 110 and processes them to sense various external states or changes of them, outputs actuation signals following the states to the sensor and actuator unit 110, and shows appropriate visual information to the display 120.

The computer 130 includes one or more processors, storage means such as a semiconductor and/or a magnetic storage, wired or wireless communications, and interfaces to input and output devices, as is well-known to one skilled in the art. Specifically, the computer 130 includes a central processing unit (CPU) 131, a display controller 132, a memory 133, a storage 134, and an input/output (I/O) unit 135. The CPU 131 controls various components of the computer 130, including a general purpose CPU, the memory 133 temporarily stores data for the operation of the CPU 131 and other types of data for various processes, the storage 134 stores data used by the computer 130 and data input and output by the sensor and actuator unit 110 and includes a storage device, and the display controller 132 controls visual information displayed to the display 120 according to control by the CPU 131. Specifications of the CPU 131, the memory 133, and the storage 134 are variable by processing targets and operational purposes of the computer 130 of the smart digital modules 100.

The computer 130 senses inputs provided by the sensors of the sensor and actuator unit 110 to detect environmental states or changes of the states, and displays actuations through the display 120 and the actuators of the sensor and actuator unit 110. For example, the computer 130 senses the user's speech provided through the microphone 114-1, and displays a corresponding actuation to the display 120 and the actuators of the sensor and actuator unit 110.

Inputs from multiple sensing devices 110 on multiple smart digital modules are combined in order to provide data for algorithms such as video stereopsis or microphone array processing methods that require observations from multiple spatial locations.

The display 120 controls the size of displayed visual information according to the user's location and movement sensed by the camera 113-1 and the ultrasonic sensor 116-1 according to control by the CPU 131. For example, in the case of displaying same information screen, the display 120 displays the total information screen when the user is near the smart digital modules 100, and the display 120 displays part of the information screen when the user is far from the smart digital modules 100. Also, the display 120 is controlled to move the displayed screen in the user's walking direction when the user's walking over the front of the display 120 is detected by the sensors of the sensor and actuator unit 110 and is then sensed by the computer 130.

The electronic components which are assembled in the minimum size through minimizing predictable problems such as electromagnetic interference (EMI) and generation of heat in consideration of performance of components in the smart digital modules 100 are effectively arranged in a case, and an interface for supplying power to the smart digital modules 100 is installed therein.

The above-noted smart digital modules are combined to form a smart digital wall which is one of smart digital surfaces, which will now be described with reference to drawings.

Figure 6:
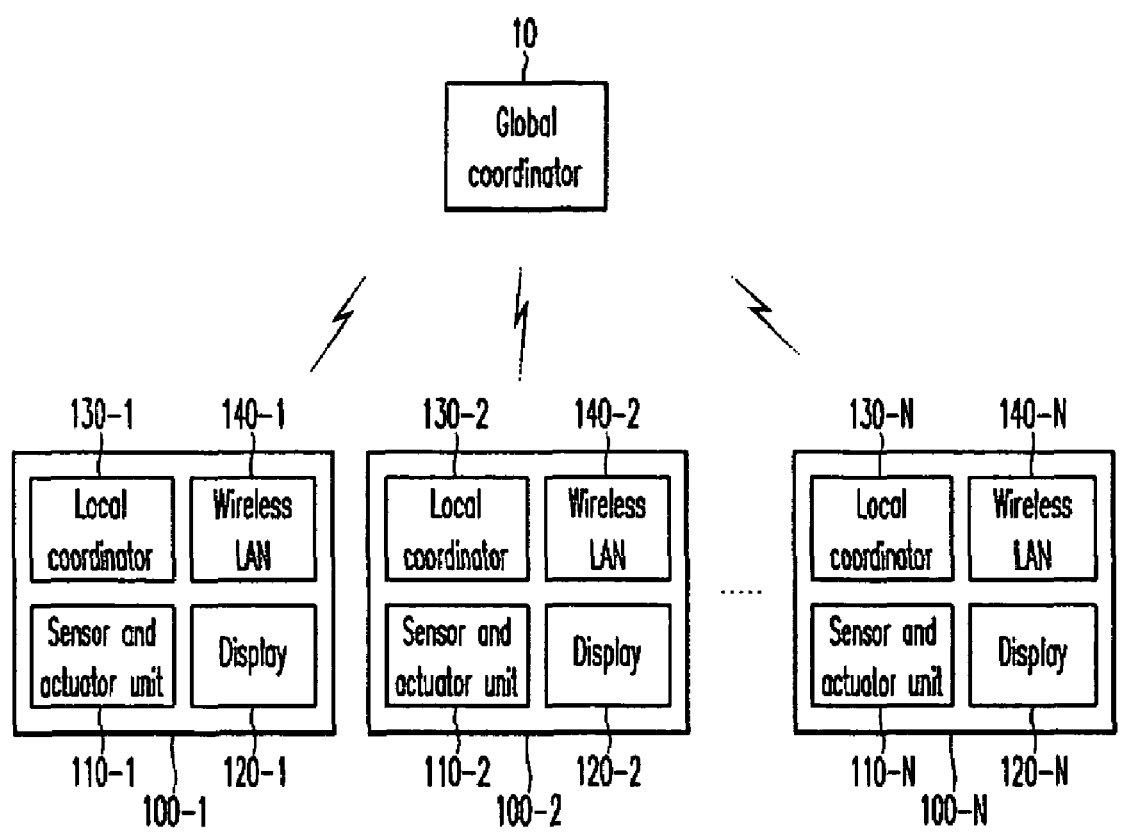
FIG. 6 shows a functional block diagram of a smart digital wall according to an exemplary embodiment of the present invention.

FIG. 6 shows a functional block diagram of a smart digital wall according to an exemplary embodiment of the present invention, and FIGS. 7(a) and 7(b) show configuration diagrams of the smart digital wall shown in FIG. 6, FIG. 7(a) illustrating a smart digital wall built by a plurality of collective smart digital modules, and FIG. 7(b) illustrating a smart digital wall constructed in a frame inserting manner.

As shown in FIG. 6, the smart digital wall includes a plurality of smart digital modules 100-1 to 100-N, and is controlled by a coordination process 10.

The smart digital modules 100-1 to 100-N further include wireless LAN units 140-1 to 140-N which allow mutual information communication via wireless LANs and information exchange with the coordination process 10 as described with reference to FIGS. 1 to 5. For example, the smart digital modules 100 includes a sensor and actuator unit 110-1 for sensing external states and changes of states through various sensors and outputting corresponding actuations, a display 120-1 for receiving signals for representing visual information and outputting corresponding images, a local coordinator 130-1 for receiving signals from the sensor and actuator unit 110-1, processing the signals to sense various external states and changes of state, and outputting actuation signals according to the states to the sensor and actuator unit 110-1 and the display 120-1, and a wireless LAN unit 140-1 for controlling information communication between the local coordinator 130-1 and the coordination process 10 via radio communication. In this instance, the local coordinator 130-1 represents the computer 130, as shown in FIGS. 1 to 5, to which a wireless LAN communication function through the wireless LAN unit 140-1 is added.

The coordination process 10 is connected to the respective local coordinators 130-1 to 130-N of the smart digital modules 100-1 to 100-N through radio communication, and controls the local coordinators 130-1 to 130-N. In detail, the coordination process 10 represents a collective decision making module for the smart digital modules 100-1 to 100-N, and controls the local coordinators 130-1 to 130-N provided in the smart digital modules 100-1 to 100-N to control collective operations including sensing, speech recognition, speech synthesis, and multimedia reproduction by the smart digital modules 100-1 to 100-N. Therefore, the local coordinators 130-1 to 130-N gather sensor data (e.g., inputs by a microphone and a camera, and values by temperature and humidity sensor) detected in real-time by the sensor and actuator units 110-1 to 110-N, transmit the sensor data to the coordination process 10 through the wireless LAN units 140-1 to 140-N when receiving a speech instruction from the user, receive an instruction from the coordination process 10, collectively use the sensor and actuator units 110-1 to 110-N and the displays 120-1 to 120-N, and display corresponding information.

The coordination process 10 can be provided to one of the smart digital modules 100-1 to 100-N forming a smart digital wall, or it can be replaced by a decentralized, collective decision-making process, but it will be described in the exemplary embodiment that the coordination process 10 is installed in a computer to thus perform corresponding functions.

FIGS. 7(a) and 7(b) show configurations of the smart digital wall.

The smart digital modules 100-1 to 100-N are stacked to thus configure a smart digital wall in FIG. 7(a), and they are inserted into a metallic frame to form a smart digital wall in FIG. 7(b).

Referring to FIGS. 7(a) and 7(b), the smart digital modules 100-1 to 100-N are combined in a grid manner to build a smart digital wall. In this process, the displays 120-1 to 120-N attached to the fronts of smart digital modules 100-1 to 100-N are configured such that the screen size may be varied within an allowable range in a like manner of conventional multivisions. Also, a grid type metallic frame for supporting the smart digital wall built by the smart digital modules 100-1 to 100-N is additionally installed in FIG. 7(b). In this instance, a predetermined gap is provided between the original constructed wall and the smart digital wall combined with the metallic frame in consideration of generation of heat from the rear of the smart digital wall. Further, cables for supplying sufficient power to the smart digital modules 100-1 to 100-N are provided in the metallic frame.

FIG. 8 shows a software architecture for controlling the smart digital wall shown in FIG. 6.

As shown, the software architecture of the smart digital wall includes: hardware including sensors and actuators; an operation system (O/S); an application programming interface (API) for supporting processing of sensor data, networking, multimedia, and a database on the O/S basis; software components for supporting multi-modality (including modules for speech recognition and gesture recognition, and a local coordinator and a coordination process for system control); and various application programs.

Figure 9A:
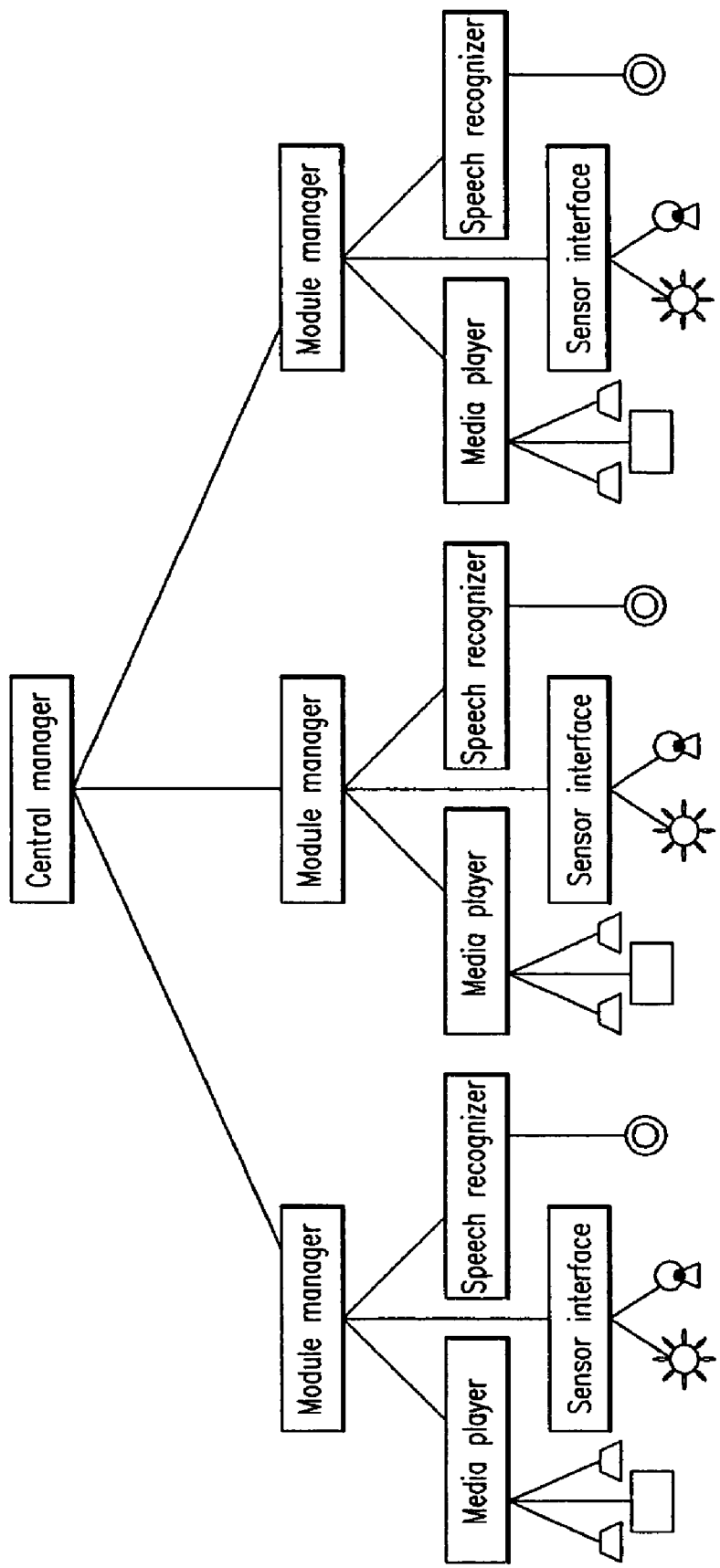
FIG. 9(a) shows an exemplified software configuration for an actuation realization of speech recognition based media reproduction in the software architecture given in FIG. 8.

FIG. 9(a) shows an exemplified software configuration for an actuation realization of media reproduction in the software architecture for controlling the smart digital wall shown in FIG. 8.

As shown, the respective smart digital modules 100-1 to 100-N have a speech recognition program, a sensor interface program, a media reproduction program, and a module management program, and a central management program for controlling the module management programs to collectively control the smart digital modules 100-1 to 100N is installed in a smart digital module.

The speech recognition program is installed in the computer 130 to receive speech recognition data from the microphone 114-1 of the sensor and actuator units 110-1 to 110-N, the sensor interface program is installed in the computer 130 to receive sensor data from other sensors and transmit the same to the module management program, and the media play program is installed in the computer 130 to receive media data from the module management program and control the media data to be reproduced by the sensor and actuator units 110-1 to 110-N and the displays 120-1 to 120-N.

The module management program is installed in the local coordinators 130-1 to 130-N to receive speech recognition data and sensor data from the speech recognition program and the sensor interface, transmit the data to the central management program, receive result data processed by the central management program, and transmit the result data to the media reproduction program.

The central management program is installed in the coordination process 10 to receive speech recognition data and sensor data from the module management program installed in the respective smart digital modules 100-1 to 100-N, process the data, control the respective module management programs, and realize an actuation such as collective media reproduction.

Figure 9B:
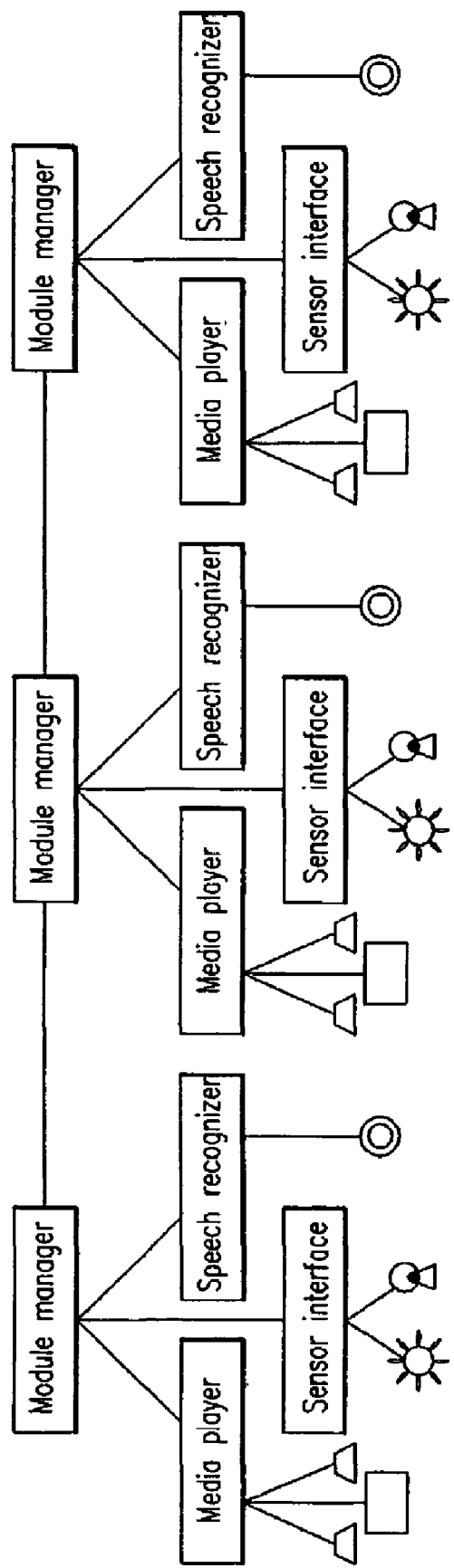
FIG. 9(*b*) shows an alternative configuration in which there is no centralized coordination.

In an alternative embodiment (FIG. 9(b),), the coordination of the processes and states of the multiple modules is handled not by a global coordinator 10, but instead by a process in which the modules exchange information in a peer-to-peer fashion by means of any of a variety of well-known messaging protocols, either one-to-one or multicast. It is also possible for the top level of a hierarchical control structure to migrate from one module to another as application circumstances require, for example a module that detects user commands could issue these directly to other modules rather than through a global coordination process.

Functions of the smart digital wall according to the exemplary embodiment of the present invention will be described.

The smart digital wall combines a plurality of interactive smart digital modules 100-1 to 100-N to provide various functions differing from the conventional output devices such as a multi-screen which allows a size-adjustable screen and reproduces sound.

One of various functions is to operate as an interactive smart multimedia player. For example, when text, images, video, audio, and combinations thereof are reproduced by one or plural smart digital modules 100-1 to 100-N, corresponding multimedia files can be stored in one or more smart digital modules 100-1 to 100-N or can be streamed and downloaded from the above-noted various sources, the multimedia contents are selected by the user's voice instruction through the sensor and actuator units 110-1 to 110-N, and the size, location, and contents of the screen of the displays 120-1 to 120-N for reproducing data based on the user's location and ID information detected by sensor inputs for location awareness and images captured by the camera are determined. For example, when the user speaks a favorite singer's name in front of the smart digital wall, the coordination process 10 operates a face sensing program to identify the user who is detected by the sensor and actuator unit 110-1 to 110-N, searches for the user's most favorite song from among the songs of the singer in the database, outputs a corresponding music video file to the screen on the displays 120-1 to 120-N based on the user's location and the distance between the user and the smart digital wall detected by the sensor and actuator units 110-1 to 110-N by controlling the screen size over one or more smart digital modules 100-1 to 100-N and reproducing the music video file to be thus adapted to the user-related environmental factors.

Another function is to operate as a personalized smart information browser. The smart digital wall transmits various categories of information to the user through one or more smart digital modules 100-1 to 100-N. In this instance, the corresponding information file is stored in one or more smart digital modules 100-1 to 100-N, or can be streamed or downloaded through the Internet, contents and features of the above-noted information are selected based on the user's ID detected through the user's voice instruction or images captured by a camera, and the size and location of images are determined according to the user's location sensed by the sensor. For example, when the user stands in front of the smart digital wall and speaks a request of a predetermined day's information, the coordination process 10 operates the face sensing program to identify the user through the sensor and actuator units 110-1 to 110-N, and displays various types of information which are stored in advance or are downloaded from the Internet or external servers to the smart digital modules 100-1 to 100-N based on an information list read by the user in the database, the information including weather, stocks, time, schedules, TV programs, shopping, and travel. When the user selects one of various types of information displayed on the smart digital wall, the coordination process 10 outputs a detailed information screen of specific information items selected based on the user's location identified by the sensor and actuator units 110-1 to 110-N and the distance between the user and the smart digital wall, controls the image size over one or more smart digital modules 100-1 to 100-N, and reproduces the controlled images, thereby being adapted to the user-related environmental factors. In this instance, when the user selects an information item displayed on a specific smart digital module by using an infrared remote controller, a PDA, or a lantern, further detailed information items having a lower rank than the selected information item are displayed on the whole or part of the smart digital wall, and the user moves a pointing device up and down in the hierarchical tree-structured information to find a desired item. When finding the desired information item, the user moves the information item to the user's front to enlarge the item or input necessary information by using various input devices. Also, when selecting one of the displayed information items, lower-rank information items are displayed in a like manner.

The coordination process 10 must support speech recognition for the purpose of interaction with the smart digital wall. The speech recognition function can omit a training process for sensitively responding to the voice of predetermined users so that the speech recognition function may be available for many users, and the speech recognition function can require another training process for accurately sensing a restricted group of users.

In detail, the respective smart digital modules 100-1 to 100-N have a speech recognition program, and hence, when the user utters a voice instruction at a specific location in front of the smart digital wall including a plurality of smart digital modules 100-1 to 100-N, the microphone 114-1 installed in the sensor and actuator unit 110-1 to 110-N of the neighboring smart digital modules 100-1 to 100-N and the speech recognition program which is a speech recognition engine mount in the computer 130 sense the user's utterance, convert words and sentences sensed by the modules into letters, and transmit the letters to the coordination process 10 through the respective local coordinators 130-1 to 130-N. When receiving sensed information from the smart digital modules 100-1 to 100-N, the coordination process 10 detects sensed words or construction of sentences with the most frequency from among the sensed words or construction of sentences, and performs the user's voice instruction. When assuming in the process that the smart digital modules 100-1 to 100-N have a speech recognition program with the speech recognition rate of 70% and ten smart digital modules 100-1 to 100-10 recognize the speech exemplarily, seven smart digital modules correctly recognize the user's voice instruction to thus produce improved performance compared to the case in which one smart digital module recognizes the speech.

For example, the whole system is normally operated when three of ten smart digital modules recognize the same words or sentences and other ones recognize them differently.

It is also possible, in either a centralized or a peer-to-peer way, to synchronize the digitizing process of microphones in multiple modules, enabling them to be used as inputs to well-known microphone array algorithms which can improve the signal-to-noise ratio of captured voices or remove unwanted sounds before passing the processed result to a speech recognition function or a conferencing application.

The speech recognition function has been described, but it is also possible for the smart digital wall to convert the given text into speech data based on the speech recognition engine installed in the smart digital modules and transmit the same to the user, and to thus perform a speech synthesis function. By using the function, it is allowed to provide information desired by the user including weather, time, stocks, temperature, humidity, and luminescence in the voice format, and in particular, when the above-noted function is combined with the speech recognition function, it is possible to provide the interactive operation with the user by asking the user via a synthetic speech and processing the user's answer through a speech recognition module. Since the smart digital modules 100-1 to 100-N forming a smart digital wall independently have a speech synthesis engine, the user can hear the synthesized voice in front of the smart digital wall irrespective of places at which the user interacts with the smart digital wall, and the user can concurrently hear various speeches with different voices from the smart digital modules 100-1 to 100-N. Instructions or information for speech synthesis are transmitted to the respective smart digital modules 100-1 to 100-N from the coordination process 10, and the smart digital modules 100-1 to 100-N use the speech synthesis engine installed therein to synthesize the corresponding speech and output the synthesized speech to the user through the speaker 117-1.

Also, an infrared sensor can be installed in the sensor actuator unit of one or more smart digital modules so that the user may manipulate the smart digital modules by using a wireless keyboard or a mouse. Therefore, signals generated by the keyboard or the mouse for wireless manipulation are provided to the infrared sensor installed in the smart digital modules and are then processed by the coordination process 10. The remote controller for controlling the smart digital modules supports selection of smart digital modules in a like manner in which the user changes television channels by pressing a channel button on the remote controller, and the remote controller includes an infrared transmitter which allows the user to transmit a control signal to the selected smart digital module or the smart digital wall which is far from the user by a predetermined distance. Accordingly, the infrared sensor installed in the sensor and actuator unit of the smart digital module senses the lengths of infrared signals generated by the infrared transmitter, the computer 130 converts the lengths into digital signals and transmits the same to the coordination process 10, and the coordination process 10 converts the digital signals into specific instructions in a software manner by using a matching table to thus activate a specific application service. The user can manipulate and perform instructions for controlling the smart digital modules within a short range by using the remote controller.

Further, another interface for controlling the smart digital modules is a touch screen. The user installs an LCD display 120-1 to 120-N on the smart digital module and performs needed functions by manually manipulating graphic user interface (GUI) components (including pull-down menus, buttons, slide bars, and icons) output to the smart digital module. The user can control one or more smart digital modules by using the touch screen function, and can add GUI components in the developing process of application services for operating the smart digital wall so as to activate the touch screen function.

Also, still another interface for remotely controlling and monitoring each smart digital module or the smart digital wall formed by plural smart digital modules is a web-based interface. When a web server is installed in one of smart digital modules, the user remotely uses a web browser installed in a terminal to access the web server's URL and then accesses the hyper text markup language (HTML) document which includes a client graphic interface for controlling and monitoring the smart digital module. The HTML document includes GUI components for exchanging data with the server in real-time such as ActiveX and JAVA BEANS. The interface components includes buttons, pull-down menus, lists, text boxes, slide bars, check boxes, video frames, and image frames, and the user handles the interface components on the web to remotely control one or plural smart digital modules and receive data such as text, images, video, and audio in real-time. The above-noted web-based remote interface allows the user to select hierarchical visual icons step by step in order to selectively control and monitor a smart digital module provided at a specific location, a smart digital wall formed by the smart digital modules, and a smart digital space configured by the smart digital walls, and communicates desired information in real-time by using the pull-down menu, the text box, and the graph. The hierarchical configuration of the user interface for specifying one or more smart digital modules 100-1 to 100-N corresponding to a target node can be achieved by visualizing the tree structure of icons which display a predetermined building, spaces in the building, walls which form the spaces, and smart digital modules which form the walls. Data communication between the web interface on the client side and the server platform on which the coordination process 10 for controlling the smart digital module and the smart digital wall is installed is executed on the basis of bidirectional socket communication using IP addresses. For example, the user at the office remotely monitors a child who stays home through moving pictures on the web browser by using a camera attached on a specific smart digital module, and manipulates the web interface, and remotely sends a text message to the child who stays in front of the specific smart digital module, and the smart digital module then receives the text message and converts the same into speech signals via a text to speech (TTS) program so that the child may hear the message.

Also, another interface for remotely controlling and monitoring the smart digital module and the smart digital wall is a hand-held device such as PDA-based mobile interface that could be used as an input or output device which could exchange data with the smart digital modules. By this interface, the user uses a stylus pen on an LCD screen of the PDA to manipulate a client GUI for controlling and monitoring one or more smart digital modules and remotely exchange desired categories of information. The PDA includes various GUI components which support real-time data communication with the server of a specific smart digital module and which include buttons, pull-down menus, lists, text boxes, slide bars, check boxes, and video and image frames. The user controls the GUI components on the PDA to remotely control one or more smart digital modules and receive desired data in various formats of text, image, video, and audio from the smart digital modules in real-time. No descriptions of the above-mentioned PDA-based remote interface will be provided since the PDA-based remote interface is similar to the web interface and a person skilled in the art will easily understand it when referring to the descriptions on the web interface. The user might also speak into the microphone on the PDA rather than a microphone on the modules, and the application software on the modules could route audio to the PDA's speaker and video to the PDA's screen.

The smart digital wall uses ultrasonic sensors 116-1, which are arranged on the smart digital modules, located at regular intervals on the smart digital wall, to sense locations, periodically scan predetermined distances in front of the smart digital wall, measure existence states of persons or goods and the distance from the wall, and accordingly use the measured data in various applications.

Further, the smart digital wall allows the user to access one or more smart digital modules on the Internet and perform needed functions and monitor desired information.

In addition, the smart digital wall captures the user's face image through the camera 113-1 attached on the smart digital module, matches the face image with a plurality of facial images in the database by using a face recognition program installed in the corresponding smart digital module to identify the user, and provides application services in consideration of personal preferences. For example, when identifying the user after recognizing the user's face, the smart digital wall displays the user's favorite songs, weather, stocks, shopping, and music video files. As to the configuration of the face recognition interface, a camera 113-1 for controlling the face recognition error rate within a predetermined range and a face recognition algorithm for optimizing variables including a distance from the user and the user's rotated angles to the right and left with reference to the user's front face are used. That is, a plurality of cameras forming a smart digital wall is used and a face recognition algorithm for registering 3-dimensional face images into the database and searching the database based on the image rendering scheme is used. In detail, images captured by at least two cameras adjacent to the user are used to register 3-dimensional face image data into the database, and when the user stands in front of the smart digital wall, the database is searched based on the face images with different angles captured by at least two cameras, and the user is accordingly identified to increase the recognition rate.

Also, it is possible for a smart digital wall to capture the user's images with various angles in real-time through a camera grid formed by a set of cameras 113-1 installed in the smart digital module. In detail, it is possible to use the camera grid, capture the user's face images in various angles, select the best image by a vote mechanism performed by the smart digital modules, and use the best image to the face recognition and other application services.

When it is desired to use multiple cameras to make models or measurements of the environment or the users, it is necessary to perform a multi-camera calibration process using one of various techniques that are well known to those skilled in the art. This can be organized in either a centralized or a distributed fashion. Once the cameras have been calibrated it becomes possible to compute distance to elements in the scene (e.g. a face, a hand, or a person) by well-known triangulation calculations taking into account the relative sizes and screen positions of features seen by individual cameras.

Also, it is possible for a smart digital wall to perform a collaborative audio capture in which a group of modules process their microphone inputs in order to localize sources or get a better copy of a voice or a sound than any single microphone could record.

The smart digital wall can further provide a dynamic electronic wallpaper service.

As to the electronic wallpaper service formed by the smart digital wall, an API-based multimedia reproduction program is used to combine the text, images, video and audio contents into electronic wallpapers, the electronic wallpapers are stored in the database, and the stored electronic wallpapers are dynamically and selectively reproduced according to the identified personal history, sensed or input personal emotional states, day times, and seasons. For example, in the case of representing a specific electronic wallpaper stored in a specific database, the smart digital modules display the contents of the electronic wallpaper selected by the coordination process (e.g., text, images, and video and audio contents) to the displays 120-1 to 120-N and the speaker 117-1 according to the instruction by the coordination process 10.

The electronic wallpaper represented on the smart digital wall can be modified by automatic environmental recognition based on various outputs of the sensors or by the user's direct inputs through the speech recognition interface. In particular, when the moving pictures are reproduced on the smart digital wall in the electronic wallpaper format, it is possible to adjust locations of some or total moving pictures, screen sizes, and volumes of background music based on the user's location detected by a distance sensor or the user's own desires. It is also possible to temporarily halt the moving pictures and configure a still image wallpaper.

Digital objects represented on the dynamic electronic wallpaper include a smart digital calendar, a clock, and a picture, they are displayed at a specific location together with the electronic wallpaper on the smart digital wall, and they can be easily moved, enlarged, reduced, and eliminated by the user. Advantages of the digital objects are: attempts of various types of design, free selection of digital objects without additional matter and cost and representation of digital objects to the smart digital wall, and flexible modification of locations and sizes thereof.

Further, an automatic security and emergency system for processing problems generated in the building can be built by using various sensors and output devices installed in the smart digital modules. One or more smart digital modules detect fire through information acquired by the temperature and humidity sensors 111-1 and 112-1 and gas sensors or through data which are generated by a mechanical visual sensor by analyzing the images captured by the camera 113-1, generates a fire alarm according to a fire algorithm stored in the smart digital modules, notifies persons concerned staying in/out of the building of the fire, and automatically reports the fire to a fire station. In this instance, the smart digital wall generates an alarm signal through the speaker 117-1 and controls the displays 120-1 to 120-N to flash the red light on and off so that the users within the building may know the emergency. In a like manner, the smart digital wall uses various sensors to sense night intruders or first-aid patients and quickly process the situations.

Figure 10:
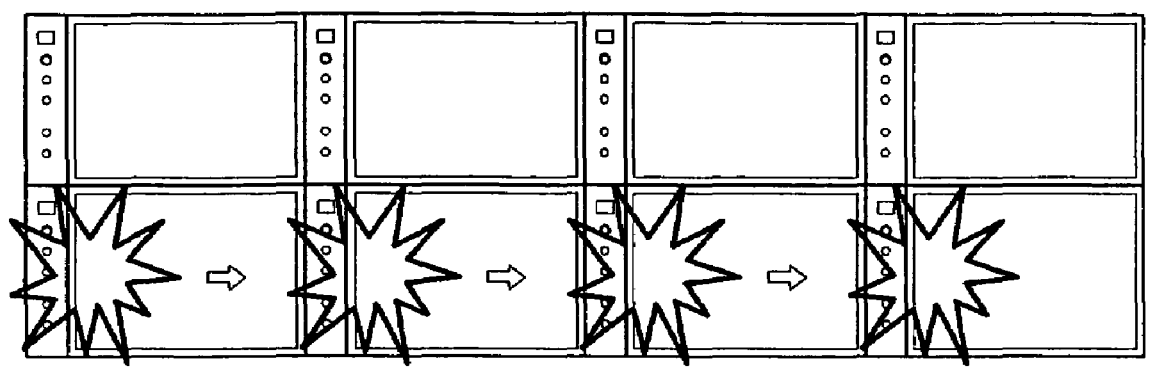
FIG. 10 shows a process for scanning a user to measure the user's location from the smart digital wall according to an exemplary embodiment of the present invention.
Figure 11:
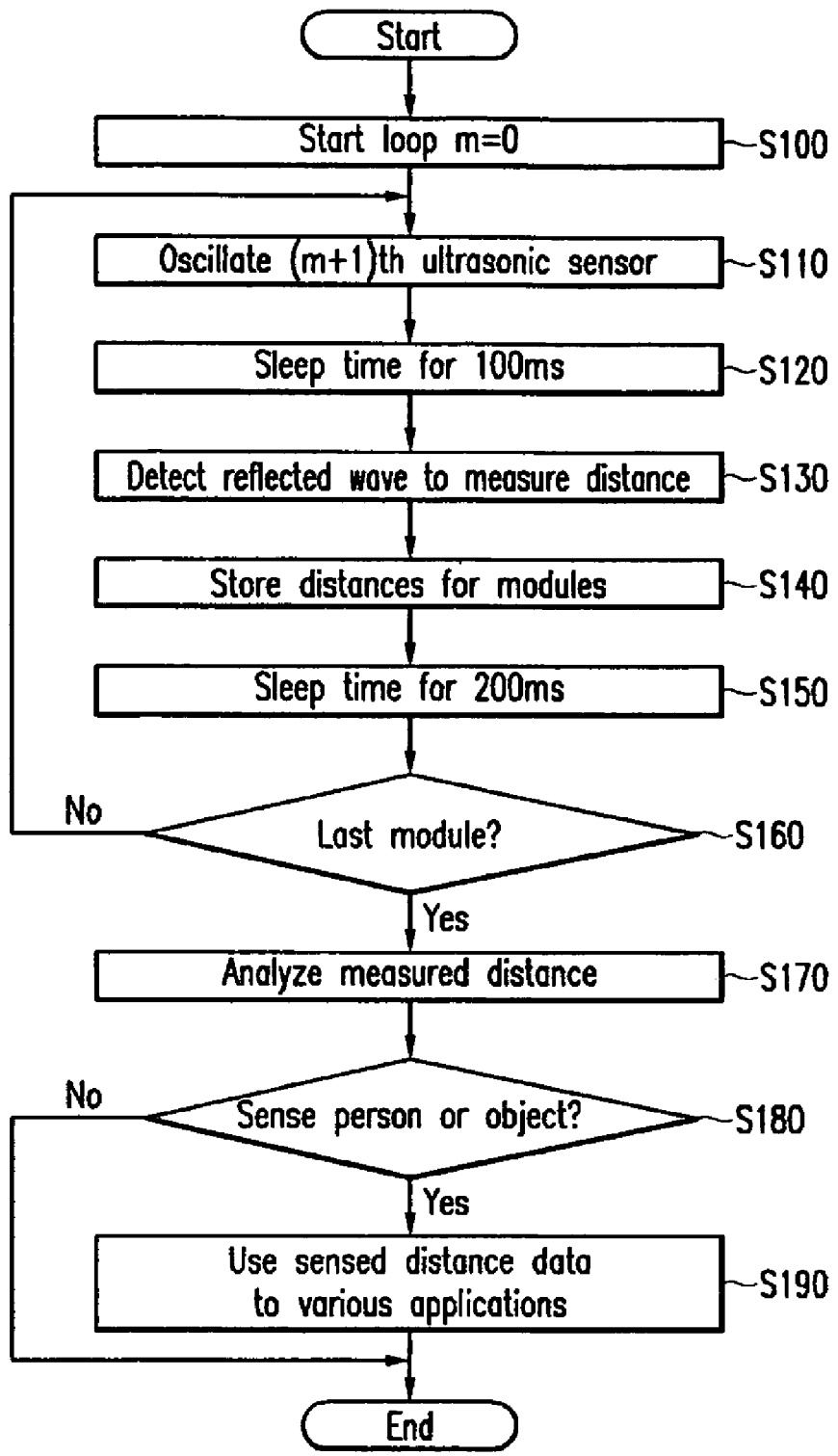
FIG. 11 shows a flowchart for the scanning process shown in FIG. 10.

FIG. 10 shows a process for scanning a user to measure the user's location from the smart digital wall according to an exemplary embodiment of the present invention, and FIG. 11 shows a flowchart for the scanning process shown in FIG. 10.

As shown in FIGS. 10 and 11, the coordination process 10 controls the sensor and actuator units 110-1 to 110-N and performs scanning through the local coordinators 130-1 to 130-N of the smart digital modules 100-1 to 100-N.

A number of smart digital modules for performing scanning is determined, a variable m for representing the number is reset to be 0, and the scanning loop is started in step S100.

The ultrasonic sensor 116-1 of the (m+1)th smart digital module is oscillated in step S110, and a sleep time of about 100 ms is provided in consideration of the time when the ultrasonic is reflected on a body and is returned in step S120.

The reflected wave is measured, and the distance to the body provided in front of the smart digital modules having the ultrasonic sensor 116-1 or the distance to the user is calculated and stored in steps S130 and S140.

A sleep time of about 200 ms is given in step of S150 in order to quench the ultrasonic generated by one smart digital module, it is checked in step of S160 whether the smart digital modules in an area to be scanned have performed scanning, and the above-described steps S110 to S150 are repeated when the scanning is not finished.

When the scanning is finished and the distances for the smart digital modules are measured, the coordination process 10 analyzes the distance data measured and stored in step of S140, in step of S170, determines whether a person or a body is sensed in front of the smart digital wall in step S180, and uses location data with the sensed person or body to various applications when the person or body is sensed.

Therefore, the above-described smart digital wall is applicable to various applications, and a context-aware video chat system realized by the smart digital wall will be described.

Figure 12A:
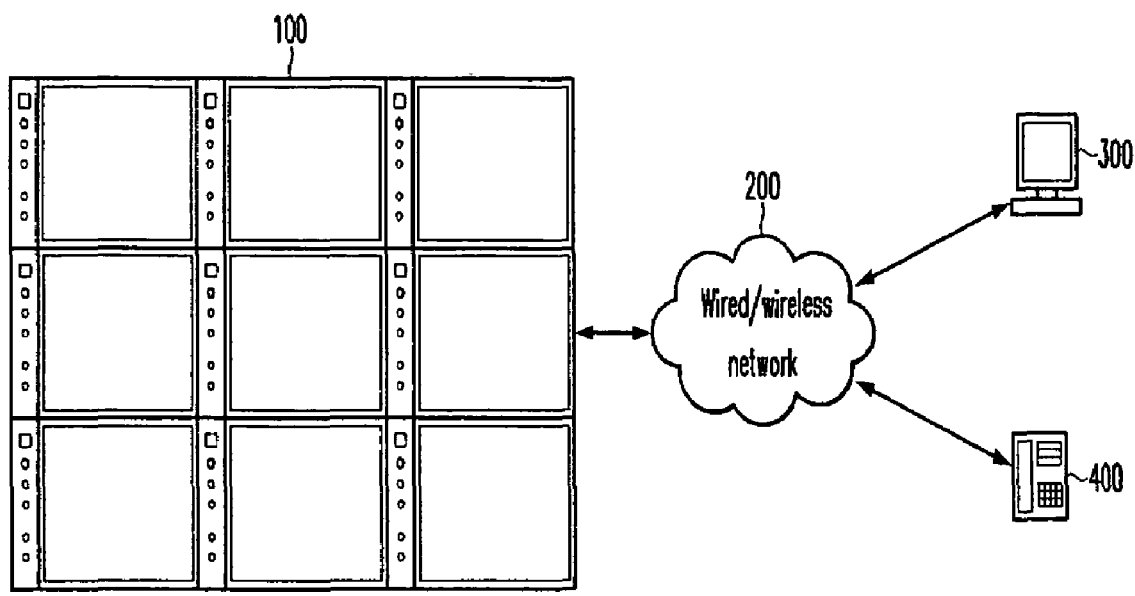
FIGS. 12(*a*) and 12(*b*) show usages of a context-aware video chat system, FIG. 12(*a*) illustrating a case in which the other party uses a general video chat system, and FIG. 12(*b*) illustrating a case in which the other party uses a context-aware video chat system.

FIGS. 12(a) and 12(b) show usages of a context-aware video chat system, FIG. 12(a) illustrating a case in which the other party uses a general video chat system, and FIG. 12(b) illustrating a case in which the other party uses a context-aware video chat system.

As shown in FIG. 12(a), the context-aware video chat system 100 is connected to a computer system 300 for supporting a general video chat function and a video phone 400 through a wired/wireless network 200, transmits and receives video and audio data thereto/therefrom, and reproduces the data to thus perform a video chat.

The context-aware video chat system 100 shown in FIG. 12(b) is connected to another context-aware video chat system 500 through the wired/wireless network 200, transmits and receives video and audio data thereto/therefrom, and reproduces the data to thus perform a video chat.

The context-aware video chat systems 100 and 500 shown in FIGS. 12(a) and 12(b) control images sizes displayed based on the distance from the user and voice volumes, and move locations of the displayed images and the reproduced speeches according to the user's movement.

The context-aware video chat systems 100 and 500 include a plurality of smart digital modules 100-1 to 100-N accumulated to be a digital wall, and are controlled by the coordination process 10 as described with reference to FIG. 6.

The smart digital modules sense external environments including the user's, transmit the corresponding data to the coordination process 10, receive an instruction from the coordination process 10, and displays corresponding actuations such as image display and speech outputs. The smart digital modules are independently operated, and each of them can be operated as an individual video chat system.

The smart digital modules 100-1 to 100-N respectively have a sensor and actuator unit, a display, a local coordinator, and a wireless LAN unit which have been described with reference to FIG. 6.

The coordination process 10 receives video and audio signals for a video chat from the smart digital modules, and transmits the sign als to the external video chat systems 300, 400, and 500 through the wired/wireless network 200, receives video and audio signals therefrom through the same, and transmits the signals to the smart digital modules corresponding to the user so that the user may chat with the other party.

The displays 120-1 to 120-N control the size of visual information displayed according to the distance from the user sensed by various sensors, in particular, the camera 113-1 and the ultrasonic sensor 116-1 of the sensor and actuator units by control of the CPU 131, and controls movements of information display according to the user's movements. For example, in the case of displaying a same information screen, the displays are controlled to visualize images on a small information screen provided by one smart digital module to the minimum when the user stays near the video chat system 100 or 500, and are controlled to visualize images on a large information screen composed of the entire set of smart digital modules to the maximum when the user stays far from the video chat system 100 or 500. Also, when the user passes in front of the displays of the video chat system, the sensor and actuator unit senses the user's movement and the local coordinators detect the movement and transmit the same to the coordination process, the coordination process 10 transmits instructions to the displays for displaying information according to the user's movement to control movement of information following the user's movement.

Figure 13:
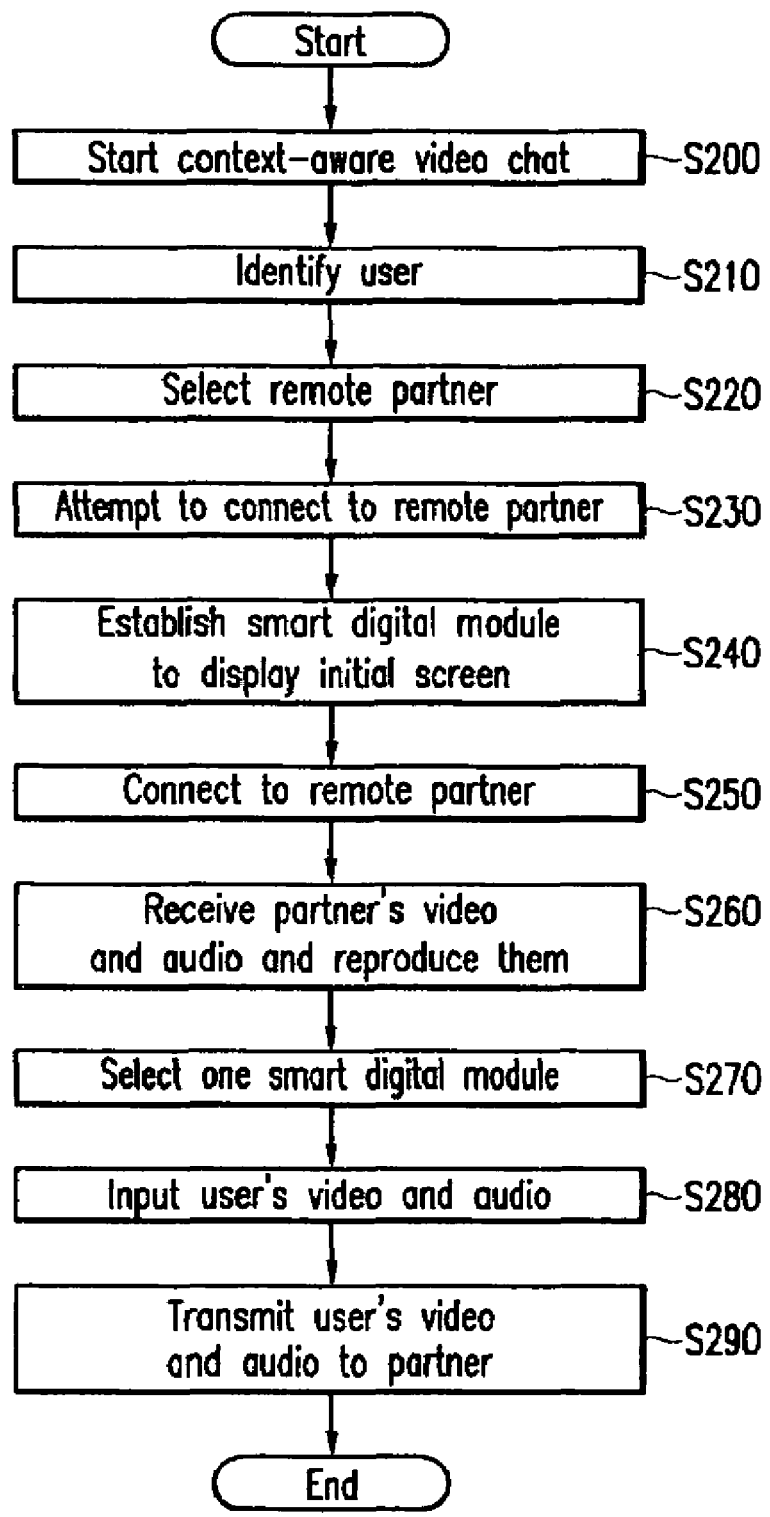
FIG. 13 shows an operation flowchart of a context-aware video chat method according to an exemplary embodiment of the present invention.

Referring to FIG. 13, an operation of the context-aware video chat system will be described.

A process for accessing external video chat systems 300, 400, and 500 by using the context-aware video chat system will now be described.

The user uses a sensor such as a touch sensor 115-1 in a sensor and actuator unit provided to one of the smart digital modules 100-1 to 100-N when staying in front of the context-aware video chat system 100, and starts a context-aware video chat in step of S200.

When the context-aware video chat is selected, the coordination process 10 identifies the user in step of S210 through an ID input process by the user or through a user face recognition process by using the smart digital modules. In this instance, in order to recognize the user's face, the user's face image at the front of the video chat system 100 is captured by the cameras 113-1 attached to the smart digital modules, and the captured face image is controlled to be matched with a plurality of face images stored in the database by using the face recognition program installed in the corresponding smart digital module, thereby identifying the user. As to the configuration of the face recognition interface, a face recognition algorithm is used to optimize the variables including the distance between the camera and the user and the user's rotated angles to the right or left with reference to the front, the variables being used to control the face recognition error within a predetermined range. That is, a plurality of cameras 113-1 forming a video chat system 100 is used, and a face recognition program for storing and searching 3-dimensional face images based on the image rendering scheme is used. In detail, the images captured by at least two cameras 113-1 near users are used to register corresponding 3-dimensional face image data into the database, and when a predetermined user stands before the video chat system 100, and the cameras 113-1 search the database with reference to the captured face images with different angles to identify the user and thus substantially increase the recognition rate.

When the user is identified in the previous step of S210, the coordination process 10 controls the user to select another party to chat with in step of S220. In this instance, when the images of remote callers whom the user calls frequently and their brief personal information are stored in advance by the user, each caller's image and personal information are displayed on the display 120 for each smart digital module, and one of the callers whose information is displayed thereto is selected by the user through a speech or a remote controller.

When the other party to chat with is selected by the user, the coordination process 10 attempts a connection for a video chat session with the selected other party through the wired/wireless telephone network 200 in step of S230. In this instance, the coordination process 10 detects the central smart digital module from among the case of selecting the context-aware video chat function, the case of the speech recognition process in the steps S200 and S220 for selecting the other party, and the case of the provided smart digital modules which have received the signals from the remote controller, and the coordination process 10 establishes the central smart digital module to be the smart digital module for displaying the initial screen of the actual video chat in step S240.

The coordination process 10 connects the smart digital module established in the previous step of S240 and modules in the ambient zone (e.g., smart digital modules adjacent to the established smart digital module) to the video chat systems 300, 400, and 500 of the other party in step of S250. When the context-aware video chat system 100 is connected to the other party's video chat systems 300, 400, and 500, video signals and audio signals of more than 10 frames per second captured by the other party's video chat systems 300, 400, and 500 through the camera and the microphone are encoded into a predetermined format of signals (e.g., MPEG-4 signals), and the MPEG-4 signals are provided to the coordination process 10 in the user datagram protocol (UDP) multicast format in step of S250.

The video and audio signals are reproduced into images and speeches and are output by part or all of the sensor and actuator units 110 of the activated smart digital modules and the displays 120 in step of S260.

When the context-aware video chat system 100 outputs the images and speeches of the other party, the user's video and audio data are to be transmitted to the other party's video chat systems 300, 400, and 500. The coordination process 10 analyzes information input by the sensor and actuator units 110 of the established smart digital modules, in particular, the ultrasonic sensor 116-1, and establishes a smart digital module which is the most adjacent to the user and receives the user's appearance and voice appropriately in step S270.

The coordination process 10 receives the user's video and audio signals from the camera 113-1 and the microphone 114-1 installed in the established smart digital module in step of S280, and transmits the signals to the other party's video chat systems 300, 400, and 500 through the wired/wireless network 200 in step of S290. In this instance, the camera grabber based on the Windows' DirectShow API can be used for the technique which captures the user's images through the camera 113-1 of the smart digital module.

The user's video and audio signals have been transmitted after the other party's video and audio signals have been received in the above description, and it is obvious that the video and audio signals can be transmitted and received between the user and the other party irrespective of the above-noted order in the actual chat.

The context-aware video chat system 100 senses the distance from the user and the context caused by the user's movement and reproduces different video and audio signals corresponding to the other party while the user video-chats with the other party.

The technique for measuring the distance from the user has been described with reference to FIGS. 10 and 11, and it will be easily understood by a person skilled in the art that the user's movement is sensed by the variation of distance to the user which is periodically measured by using the technique.

An operation for controlling the image size displayed according to the distance to the user will be described.

The coordination process 10 measures the distance to the user from the video chat system 100 through various sensed inputs provided by the ultrasonic sensors 116-1 of the smart digital modules, and uses the measured information for factors of controlling the screen size for the current video chat session.

Figure 14A:
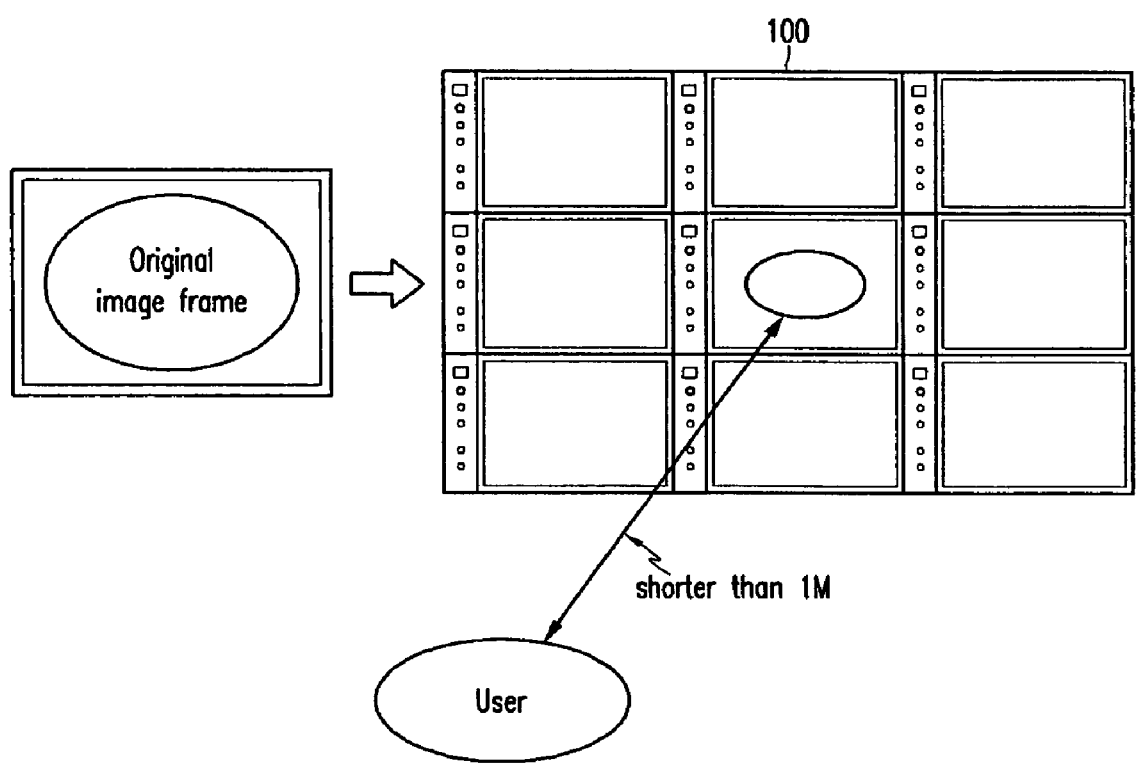
FIGS. 14(*a*) and 14(*b*) show a method for adjusting a screen size depending on the user's location in the context-aware video chat method, FIG. 14(*a*) illustrating a case in which the distance between a user and the context-aware video chat system is shorter 1 meter, and FIG. 14(*b*) illustrating a case in which the distance between a user and the context-aware video chat system is longer than 1 meter.
Figure 14B:
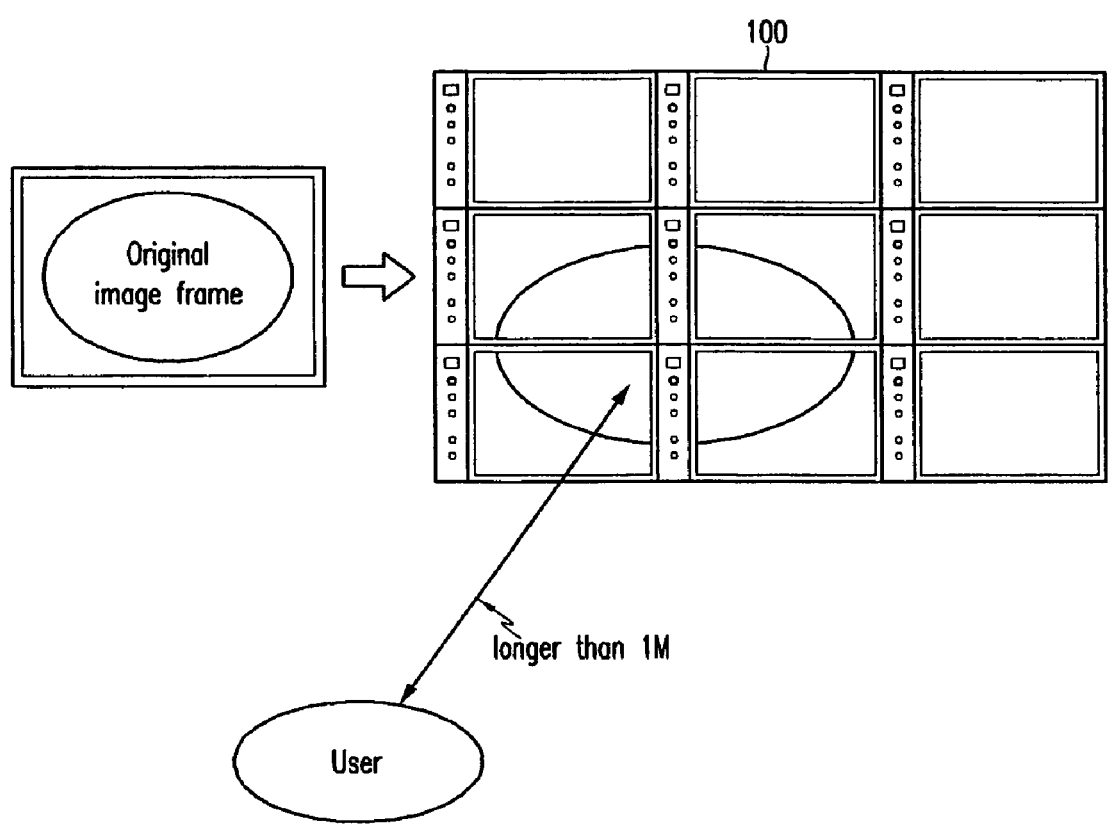

For example, when the distance between the video chat system 100 and the user is given within one meter, the video and audio transmitted from the other party's video chat system 300, 400, and 500 are reproduced to the smart digital module provided in front of the user as shown in FIG. 14(a). When the distance therebetween is more than one meter, the coordination process 10 senses the distance to be long, and multicasts the video signals transmitted by the other party's video chat systems 300, 400, and 500 to the smart digital modules provided in front of the user, the local coordinators 130-1 to 130-N of the smart digital modules display partial images divided according to the locations of the smart digital modules, and accordingly, an enlarged image is reproduced and displayed over plural smart digital modules. Therefore, media players for dividing the original image data into smaller ones according to the location of the smart digital module and corresponding to the enlarged screen are installed in the local coordinators 130-1 to 130-N of the smart digital modules, and no description on the media players will be provided since they are well known.

Since the screen size for displaying the images of other party can be enlarged or reduced depending on the distance between the user and the video chat system 100, it is needed for the smart digital modules within the ambient zone (with reference to the main smart digital module for controlling inputs and outputs of the current video chat), that is, adjacent smart digital modules to be activated and be prepared for enlargement and reduction of the screen size according to the varied distance between the user and the video chat system 100, and the respective smart digital modules are controlled whether to receive and reproduce the video and audio signals transmitted by the other party's video chat systems 300, 400, and 500 depending on the screen enlargement or reduction instruction by the coordination process 10.

Also, when the distance to the user is long and the image is displayed over at least two smart digital modules, the respective smart digital modules display divided parts of the whole image and synchronizes the image frames divided and reproduced by the smart digital modules. In this instance, the synchronization is performed by the network time protocol (NTP) based synchronization algorithm maintained by the coordination process 10 which effectively uses a buffer for the reproduced video signals and controls the video chat system 100.

An operation for controlling the speech reproduced based on the distance to the user will be described.

The speech volume of the other party can be controlled based on the distance between the video chat system 100 and the user in a like manner of the method for controlling the screen size which displays the other party's image based on the distance between the video chat system 100 and the user.

For example, when the distance to the user is shorter than a predetermined length such as one meter, speech with a reduced volume transmitted by the other party's video chat systems 300, 400, and 500 is reproduced and output by one or more smart digital modules provided in front of the user. When the distance to the user is longer than one meter, the coordination process 10 senses the longer distance and reproduces and outputs the speech with an increased volume through the speaker 117-1 installed in one or more smart digital modules.

When the distance to the user is far and the image is reproduced over at least two smart digital modules, the speech signals reproduced by the smart digital modules are synchronized in a like manner of video signals. The synchronization is performed by the NTP based synchronization algorithm maintained by the coordination process 10 which effectively uses the buffer for the reproduced audio signals and controls the video chat system 100.

A transition operation of a target smart digital module for inputs and outputs of a video chat session under progress in response to the user's movement will now be described.

The coordination process 10 uses the ultrasonic sensors 116-1 which sense the distance to the user, are installed in the smart digital modules, and are provided with a predetermined height, and periodically performs scanning to detect the user's movements.

Figure 15A:
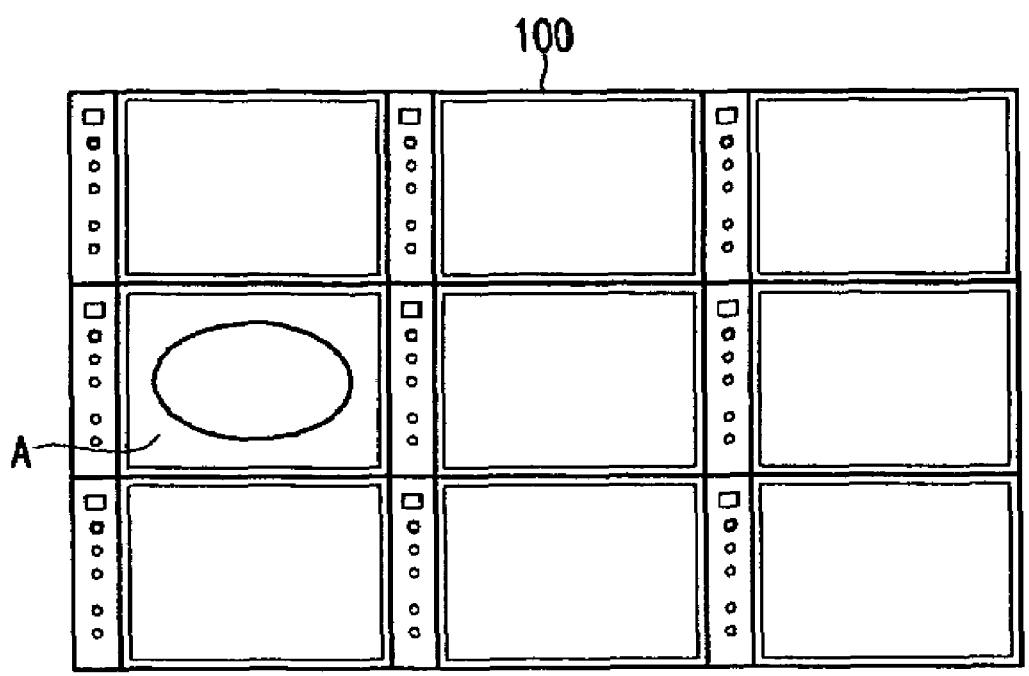
FIGS. 15(*a*) to 15(*c*) show transition of smart digital modules which display images depending on the user's movement in the context-aware video chat method, FIG. 15(*a*) illustrating a case in which the user stays on the left side of the smart digital modules, FIG. 15(*b*) illustrating a case in which the user moves to the center thereof, and FIG. 15(*c*) illustrating a case in which the user moves to the right side thereof.

When the user moves to another location while chatting with the other party and the coordination process 10 senses the user's movement through periodical scanning, the coordination process 10 establishes one or more smart digital modules corresponding to the user's new location, and transmits the video and audio signals transmitted by the other party's video chat systems 300, 400, and 500 to the established one or more smart digital modules to thus reproduce and output the corresponding video and audio. In this instance, the smart digital modules which correspond to the user's previous location are either inactivated according to the new location's close status to the previous location or are established to enter a standby mode. Referring to FIG. 15(*a*), when the user stays on the first left location of the video chat system 100, the video chat system 100 displays the image of the other party to the smart digital module A corresponding to the first location, and reproduces speech. Referring to FIG. 15(*b*), when the user moves to the second central location, the video chat system 100 displays the image of the other party to the smart digital module B corresponding to the second location, and reproduces speech. In a like manner, When the user moves to the third right location, the video chat system 100 displays the image of the other party to the smart digital module C corresponding to the third location, and reproduces speech. Hence, adaptive video chat is allowed by exchanging the smart digital modules as the user moves to other locations.

The smart digital modules with the activated ultrasonic sensors stand by until a video chat is started because of the user's movement, while the coordination process 10 performs scanning.

Figure 16A:
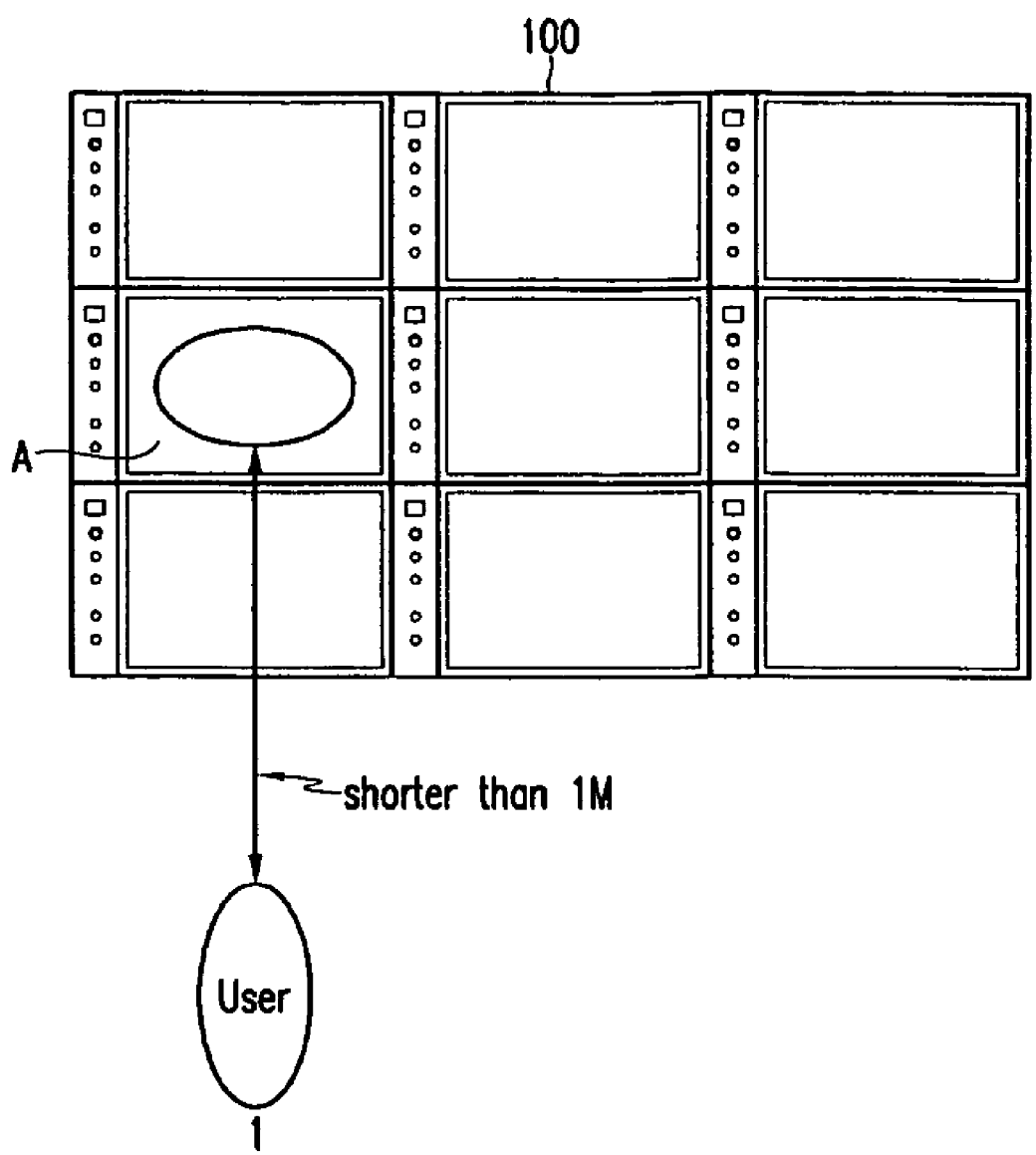
FIGS. 16(*a*) and 16(*b*) show transition of smart digital modules which adjust the screen size and display images depending on the user's location and movement in the context-aware video chat method, FIG. 16(*a*) illustrating a case in which the user stays on the left side of the smart digital modules with a distance of shorter than 1 meter therebetween, and FIG. 16(*b*) illustrating a case in which the user moves to the center thereof with a distance of longer than 1 meter therebetween.
Figure 16B:
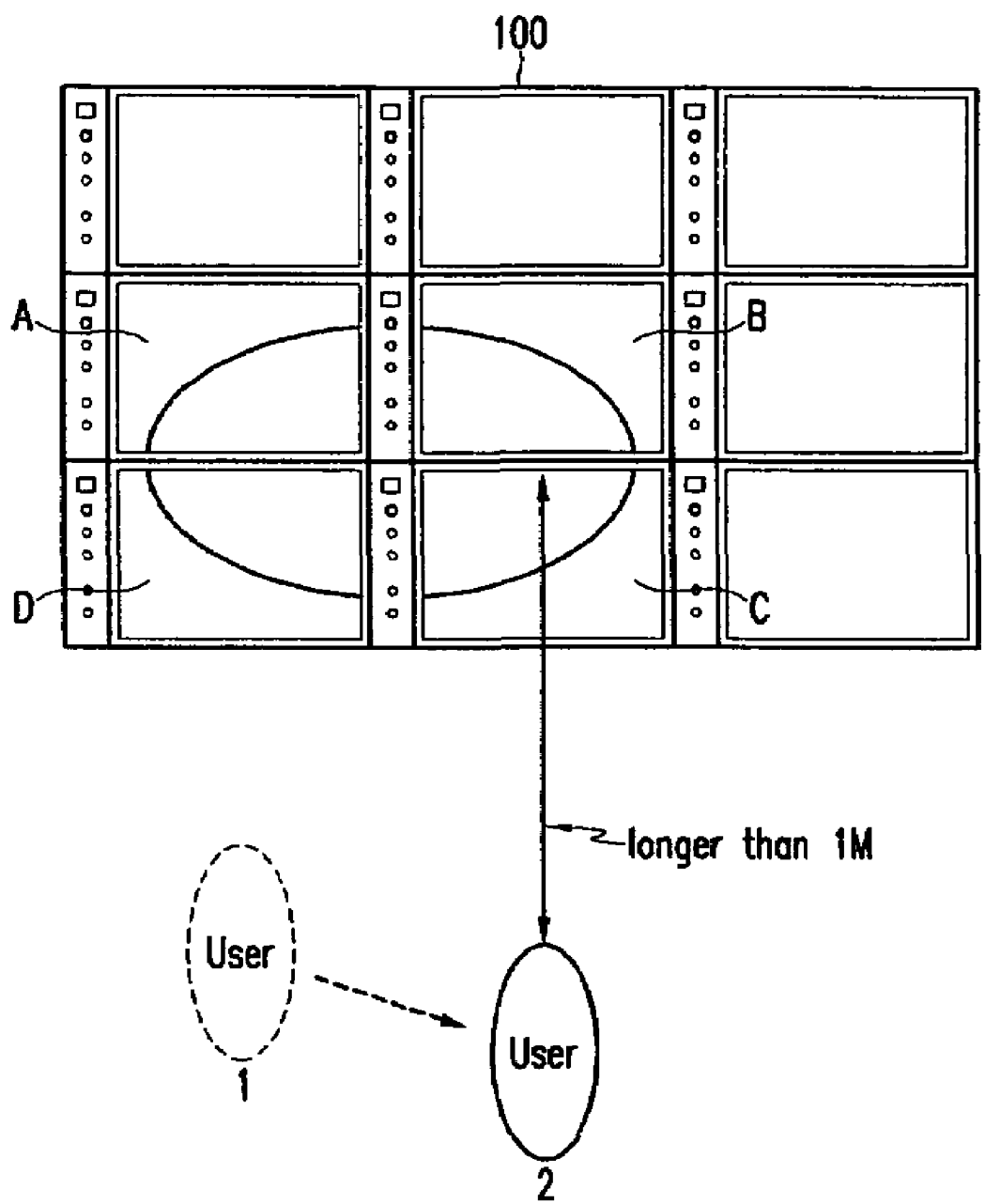

Also, it will be easily understood by a person skilled in the art that the user's location based screen size and speech volume are adjusted as the user moves to the other locations (including the above-described cases in which the user has stayed in front of the video chat system 100 within one meter and has moved to another location to thus be far from the video chat system by more than one meter.) For example, as shown in FIG. 16(*a*), when the user stays on the left of the video chat system 100 with the user's distance to the video chat system of less than one meter (i.e., he stays at the first location), the video chat system 100 displays the other party's image to the smart digital module A and reproduces the speech. As shown in FIG. 16(*b*), when the moves to the center of the video chat system, the second location with the distance to the video chat system of greater than one meter, the video chat system 100 enlarges the original image and displays the enlarged image over the smart digital modules A, B, C, and D, and reproduces a louder speech.

Therefore, the user uses dynamic video chat sessions adaptive to the user's movements through the context-aware video chat system 100.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

For example, the case in which the distance to the user from the video chat system 100 is within a predetermined value and the other case in which the distance is more than the predetermined value have been described, and in addition, without being restricted to these cases, the distance can further be divided into plural levels to control the screen size depending on the levels, which is also applicable to controlling speech volumes.

Further, inconvenience caused by locations is eliminated by automatically adjusting the screen size and speech volume according to the user's location, and inconvenience caused by movements is eliminated by adaptively changing the locations of image and speech reproduction according to the user's movement, thereby allowing the user to undergo dynamic video chat sessions.

The above-described system can also provide a platform for telecollaboration. Combining the video chat function with other collective sensing, computation, and output processes creates linked interactive visualization spaces for high-dimensional data with multimodal interfaces.

The smart digital modules and the smart digital wall expect subsequent advantages.

1. Modularity: Combinations of smart digital modules generate various functional variations by inputting and outputting various categories of information according to the sensed context, and effective combinations of computing resources installed in the smart digital modules participating in a specific scenario provide highly controlled collective actuations.

2. Multifunctionality: Variable potentialities of functions are given through state transition provided to the smart digital wall, a set of smart digital modules. For example, the functions of televisions, radios, computers, and videophones can be realized by the same hardwired device.

3. Adaptability: The smart digital wall changes its state based on requests by the user or analysis of contextual information acquired by the smart digital wall, thereby realizing adaptive actuations corresponding to sensed events.

4. Multi-modality: The smart digital wall is interactive with the user through various input and output means including speech recognition, gesture recognition, physical contacts, a PDA, a laser pen, and the Internet.

What is claimed is:

1. A smart digital module intended to work with one or more similar modules for sensing and output of information, comprising:
   a sensor unit for sensing ambient states and changes of states;
   an actuator unit for outputting various categories of information in correspondence to the ambient states and changes of states;

a display for displaying visual information; and a computer for processing signals output by the sensor and displaying corresponding actuation information to the actuator and the display, wherein the computers in a group of smart digital modules coordinate their observations and reactions in such a way that they change states of information output by the actuators and visualized by the displays according to the detected user's location and states sensed by the sensors, and the computer generates a large visual information display across the smart digital module when the user's location sensed by the sensor unit is found to be far with reference to the smart digital module.

2. The smart digital module of claim 1, wherein the sensor unit includes an environment sensor for detecting the ambient states and a behavior sensor for detecting the user's changes of activities.

3. The smart digital module of claim 2, wherein the environment sensor includes a temperature sensor for measuring the ambient temperature, a humidity sensor for measuring the ambient humidity, and a luminescence sensor for measuring the ambient luminescence, and the behavior sensor includes a camera for capturing images, a microphone for receiving speech, a touch sensor for sensing touch inputs, an ultrasonic sensor for sensing the user's location through the ultrasonic, and an infrared sensor for sensing infrared signals provided by a remote controller.

4. The smart digital module of claim 1, wherein the computer comprises:

a central processing unit (CPU) for performing data processing and system control;

a memory for temporarily storing data for operation of the CPU and data for various processes;

a storage unit for storing data used by the computer and data input by the sensor unit; and a display controller for controlling visual information displayed on the display according to control by the CPU.

5. The smart digital module of claim 1, wherein the sensor unit and the actuator unit are provided on a stripe type printed circuit board (PCB) near one of the right and left of the display.

6. The smart digital module of claim 5, wherein the computer is provided on the rear of the display, and the sensor unit, the actuator unit, the display, and the computer are built into a case.

7. The smart digital module of claim 1, where the user's distance and movement are sensed by processing images from the camera.

8. The smart digital module of claim 1, where the user's distance and movement are sensed by a combination of processing images from the camera and processing data from other sensors.

9. A smart digital wall for sensing and output of information, comprising:

at least two smart digital modules for sensing ambient states and changes of states and respectively displaying corresponding actuations; and a coordination process either in a centralized fashion or in a peer-to-peer fashion for combining the smart digital modules and controlling a collective operation of the combined smart digital modules via wired or wireless communication, wherein the coordination process changes the position and shape of a visualized information display across the smart digital modules according to the user's location sensed by the smart digital modules.

10. The smart digital wall of claim 9, where the control process is handled through a coordination process which communicates with all the modules.

11. The smart digital wall of claim 9, where the control process is a peer-to-peer process among the digital modules.

12. The smart digital wall of claim 9, wherein the coordination process realizes adaptive actuations corresponding to sensed events through the smart digital modules based on the user's request sensed by at least one smart digital module and recognition of contextual information.

13. The smart digital wall of claim 9, wherein the respective smart digital modules comprise:

a sensor unit for sensing ambient states and changes of states;

an actuator unit for outputting various categories of information in correspondence to the ambient states and changes of states;

a display for displaying visual information; and a local process for processing signals output by the sensor unit, outputting corresponding actuation information to the actuator unit and the display, and transmitting signals output by the sensor unit to other modules or to a coordination process; and a wired or wireless LAN unit for transmitting information to other modules or to a coordination process, the LAN unit being connected to the local process, wherein the coordination process changes the location and format of visual information displayed to the displays installed in the smart digital modules according to the user's location sensed by the sensor unit.

14. The smart digital wall of claim 9, wherein the smart digital modules are stacked to form the smart digital wall.

15. The smart digital wall of claim 9, wherein the smart digital modules are inserted into a grid type metallic frame and are interconnected therebetween to form the smart digital wall.

16. The smart digital wall of claim 10, wherein the coordination process is resident on one of the smart digital modules or on another computer or is distributed on all smart digital modules forming the smart digital wall.

17. The smart digital wall of claim 13, wherein when location sensors of the sensor units in the smart digital modules are provided at regular intervals with reference to the smart digital wall, the coordination process uses the location sensors to periodically scan predetermined distances in front of the smart digital wall, measure the user's location, and control the location and size of the visual information screen through the actuator units and the displays.

18. The smart digital wall of claim 13, wherein the smart digital modules respectively include a microphone for receiving speech and a speech recognition engine for processing the speech, and the coordination process processes the user's speech acquired through the microphone and the speech recognition engine into words to recognize the user's speech instruction.

19. The smart digital wall module of claim 18, wherein the coordination process combines the sounds acquired from microphones on at least two modules before passing the result to the speech recognition process.

20. The smart digital wall of claim 13, wherein the smart digital modules respectively include an infrared sensor for receiving infrared signals, and the coordination process receives infrared signals from the remote controller through the smart digital modules and processes the user's instruction.

21. The smart digital wall of claim 13, wherein one of the smart digital modules functions as a web server, and the web server functions as a web interface for receiving the user's instruction from a web server accessible terminal Through a network and controlling the smart digital modules.

22. The smart digital wall of claim 13, wherein one of the smart digital modules functions as a server, and
the server functions as a wireless interface for receiving the user's instruction from the server accessible mobile terminal including a PDA through a wireless LAN communication, and monitoring and controlling the smart digital modules.

23. The smart digital wall of claim 13, wherein the user's front face images are acquired though cameras installed in the smart digital modules, the acquired face images are matched with a plurality of face images stored in a database by using a face recognition program installed in the corresponding smart digital modules to identify the user, and the user's identity is used to provide application services in consideration of personal preferences.

24. The smart digital wall of claim 13, wherein the user controls graphic user interface (GUI) components output to a specific smart digital module Through touch screens installed in one or more smart digital modules to apply the GUI components as an interface for controlling one or more smart digital modules.

25. The smart digital wall of claim 13, wherein the smart digital modules respectively include a speaker for outputting speech and a speech synthesis engine for synthesizing input text into speech, and
the smart digital modules convert instructions and information provided by the coordination process into speech through the speech synthesis engine, and provide speech instructions and information to the user.

26. The smart digital wall of claim 13, further comprising a database for storing electronic wallpapers generated by combinations of text, images, and video and audio contents,
wherein the coordination process selects a predetermined electronic wallpaper in the database according to an instruction sensed by the sensor units of the smart digital modules or input by the user, and provides a dynamic electronic wallpaper function Through the actuators of the smart digital modules and the displays.

27. The smart digital wall of claim 26, wherein when the electronic wallpaper is reproduced in the moving picture format on the smart digital wall, at least one of a location of the electronic wallpaper, a screen size, and a volume of background music is controlled based on the user's location and the user's instruction sensed by the sensor unit.

28. The smart digital wall of claim 26, wherein a plurality of digital objects including a calendar, a clock, and a picture displayed at predetermined locations together with the electronic wallpaper reproduced on the smart digital wall can be moved, enlarged, reduced, and eliminated according to the user's instruction through the sensor units of the smart digital modules.

29. The smart digital wall of claim 13, wherein a contents provider for text, images, and video and audio contents is installed in the smart digital modules, and
the coordination process reproduces multimedia contents input by the contents provider through the sensor units and part or all of the displays according to the instruction sensed by the sensor units or input by the user, provides the reproduced multimedia contents to the user, and thereby provides an interactive multimedia reproducer function.

30. The smart digital wall of claim 29, wherein when the smart digital wall is connected to a remote contents provider providing either or both of a broadcast and a video/audio-on-demand service such as cable, satellite, or Internet provider.

31. The smart digital wall of claim 29, wherein the coordination process performs a reproduction control operation including temporary pause and rewinding of the multimedia contents which are currently reproduced through the user's instruction sensed by the sensor units of the smart digital modules.

32. The smart digital wall of claim 13, wherein at least one of the smart digital modules is accessible to an external contents server through the network, and
the coordination process provides information in a user readable format to thereby provide a personalized information browser function, the information being stored in the smart digital modules or downloaded from external contents servers through the network according to the instruction sensed by the sensor units or input by the user.

33. The smart digital wall of claim 32, wherein the coordination process displays information items to the smart digital modules over part or all the displays in a tree structure of hierarchical information according to the instruction sensed by the sensors or input by the user, and displays information items in the lower rank in a like manner when the user selects one of the smart digital modules.

34. The smart digital wall of claim 13, wherein the coordination process analyzes information sensed by the sensors to determine presence of fire, and
when the fire is sensed, the coordination process generates a fire alarm to the actuators and the displays and reports presence of fire to the outside through a communications network to thus provide a smart fire alarm function.

35. The smart digital wall of claim 34, wherein the coordination process displays a flashing red screen to the displays of the smart digital modules when fire has been sensed, to display the emergency of fire to the neighboring users, 36. The smart digital wall of claim 13, wherein the coordination process analyzes information sensed by the sensors to determine whether a person has intruded, and
when the intrusion is found, an intrusion alarm is generated through the actuator units and the displays, and the intrusion is reported to the outside through a communications network to thus provide a smart intrusion security function.

37. The smart digital wall of claim 13, wherein the coordination process analyzes information sensed by the sensors to determine the user's health state, and
when the user is found to require medical assistance, an emergency alarm is generated through the actuator units and the displays, and the emergency is reported to the outside through a communications network to thus provide a smart emergency function.

38. A context-aware video chat system based on a user's location, comprising:
at least two smart digital modules for respectively measuring a distance to the user, receiving the user's video and audio, and outputting the other party's video and audio; and
a coordination process for connecting one or more smart digital modules to the other party's video chat system through a wired/wireless communications network,
wherein the coordination process controls a number of the smart digital modules for forming a screen on which the other party's images are reproduced according to the user's location measured by the smart digital modules, and wherein the coordination process changes the position and shape of a visualized information display across the smart digital modules according to the user's location measured by the smart digital modules.

39. The context-aware video chat system of claim 38, wherein the coordination process controls the volume of the other party's reproduced speech according to the user's location measured by the smart digital modules.

40. The context-aware video chat system of claim 38, wherein the number of smart digital modules reproducing the other party's images is greater in the case in which the distance to the user from the context-aware video chat system is longer than a predetermined distance than the case in which the distance to the user from the context-aware video chat system is shorter than the predetermined distance.

41. The context-aware video chat system of claim 39, wherein the speech volume is greater in the case in which the distance to the user from the context-aware video chat system is longer than a predetermined distance than the case in which the distance to the user from the context-aware video chat system is shorter than the predetermined distance.

42. A context-aware video chat system based on a user's location, comprising:
   at least two smart digital modules for respectively measuring a distance to the user, receiving the user's video and audio, and outputting the other party's video and audio; and
   a coordination process for connecting one or more smart digital modules to the other party's video chat system through a wired/wireless communications network,
   wherein the coordination process changes the position and shape of a visualized information display across the smart digital modules according to the user's location measured by the smart digital modules, and
   wherein the coordination process changes the smart digital module on which the other party's images are reproduced according to the user's movement measured by the smart digital modules.

43. The context-aware video chat system of claim 42, wherein the coordination process changes the smart digital module on which the other party's speech is reproduced according to the user's movement measured by the smart digital modules.

44. The context-aware video chat system of claim 42, wherein the coordination process uses distance sensors for measuring the distance to the user to perform periodical scanning and sense the user's movement.

45. The context-aware video chat system of claim 42, wherein the coordination process controls the number of digital modules which form a screen for reproducing the other party's images according to the user's location measured by the smart digital modules, and controls the speech volume of the other party.

46. The context-aware video chat system of claim 45, wherein the number of smart digital modules reproducing the other party's images is greater in the case in which the distance to the user from the context-aware video chat system is longer than a predetermined distance than the case in which the distance is shorter than the predetermined distance, and
   the speech volume is greater in the case in which the distance to the user from the context-aware video chat system is longer than the predetermined distance than the case in which the distance is shorter than the predetermined distance.

47. The context-aware video chat system of claim 38, wherein the coordination process processes camera input for finding the user's face and thus determines the user's distance and movement.

48. The context-aware video chat system of claim 47, wherein the coordination process uses views of the user's face from at least two modules, and applies triangulation to determine the user's distance.

49. The context-aware video chat system of claim 38, wherein the smart digital modules respectively include:
   a sensor unit for measuring the distance to the user, and receiving the user's video and audio;
   an actuator unit for outputting the other party's audio;
   a display for outputting the other party's video;
   a local process for processing signals output by the sensor unit, transmitting the processed signals to other modules or to a coordination process, and displaying the signals transmitted by other modules or a coordination process to the actuator unit and the display; and
   a wired or wireless LAN unit for transmitting information to other modules or to a coordination process, the LAN unit being connected to the local process.

50. The context-aware video chat system of claim 38, wherein graphical and/or multimedia information can be displayed on the modules for collaboration purposes in addition to the images of the users.

51. The context-aware video chat system of claim 38, wherein the coordination process is resident on one of the smart digital modules or on another computer.

52. The context-aware video chat system of claim 38, wherein the sensor unit comprises a camera for capturing images, a microphone for receiving speech, a touch sensor for sensing touch inputs, and an ultrasonic sensor for sensing the user's location though the ultrasonic.

53. A context-aware video chat method based on a user's location in a context-aware video chat system including at least two smart digital modules for measuring the distance to the user, respectively receiving the user's video and audio, and respectively outputting the other party's video and audio, and a coordination process connecting one or more smart digital modules to the other party's video chat system via a wired/wireless communications network, the method comprising:
   (a) controlling the smart digital module reproducing the other party's video to measure the distance to the user;
   (b) controlling the coordination process to compare the distance measured in (a) with a predetermined distance; and
   (c) controlling the coordination process to control the volume of the other party's reproduced speech and to change the position and shape of a visualized information display across the smart digital modules according to the comparison result.

54. The context-aware video chat method of claim 53, wherein (c) comprises reducing the screen size to be smaller compared to the case in which the measured distance is longer than the predetermined distance, and reducing the speech volume when the measured distance is shorter than the predetermined distance according to the comparison result.

55. A context-aware video chat method based on a user's location in a context-aware video chat system including at least two smart digital modules for measuring the distance to the user, respectively receiving the user's video and audio, and respectively outputting the other party's video and audio, and a coordination process connecting one or more smart digital modules to the other part/s video chat system via a wired/wireless network, the method comprising:

(a) controlling the smart digital module reproducing the other party's video to periodically measure the distance to the user in a specific order;

(b) controlling the coordination process to determine the video-chatting user's movement based on the distance measured in (a); and (c) controlling the coordination process to determine a smart digital module on which the other party's video is reproduced according to the determination result and to change the position and shape of a visualized information display across the smart digital modules according to the distance measured by the smart digital modules.

56. The context-aware video chat method of claim 55, wherein (b) further comprises controlling the coordination process to compare the distance measured in (a) with a predetermined distance.

57. The context-aware video chat method of claim 55, wherein (c) comprises changing the smart digital module on which the other party's video is reproduced when the user is determined to have moved.

58. The context-aware video chat method of claim 56, wherein (c) comprises reducing the screen size to be smaller compared to the case in which the measured distance is longer than the predetermined distance, and reducing the speech volume, when the measured distance is shorter than the predetermined distance according to the comparison result.

59. The context-aware video chat method of claim 55, wherein (a) comprises determining the specific order for smart digital modules with a predetermined height with reference to one or more smart digital modules reproducing the other party's video.

60. The context-aware video chat method of claim 55, wherein (a) comprises processing camera input for finding the user's face and thus determining the user's distance and movement.

61. The context-aware video chat method of claim 60, wherein the image processing uses views of the user's face from at least two modules, and applies triangulation to determine the user's distance.

* * * * *

UNITED STATES PATENT AND TRADEMARK OFFICE
CERTIFICATE OF CORRECTION

PATENT NO. : 7,636,365 B2
APPLICATION NO. : 11/054109
DATED : December 22, 2009
INVENTOR(S) : Chang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1353 days.

Signed and Sealed this

Ninth Day of November, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,636,365 B2 |
| APPLICATION NO. | : 11/054109 |
| DATED | : December 22, 2009 |
| INVENTOR(S) | : Chang et al. |

Page 1 of 1

It is certified that error appears in the above-identified patent and that said Letters Patent is hereby corrected as shown below:

Title page, item (73), should read;

Assignee: KOREA ADVANCED INSTITUTE OF SCIENCE AND TECHNOLOGY, DAEJEON (KR) MIT TECHNOLOGY LICENSING OFFICE, Cambridge, Massachusetts

Signed and Sealed this
Twenty-fourth Day of July, 2012

David J. Kappos
*Director of the United States Patent and Trademark Office*